US012585419B2

(12) United States Patent
Yuan et al.

(10) Patent No.: US 12,585,419 B2
(45) Date of Patent: Mar. 24, 2026

(54) AUDIO PROCESSING METHOD AND APPARATUS, AND ELECTRONIC DEVICE

(71) Applicants: Beijing Zitiao Network Technology Co., Ltd., Beijing (CN); Douyin Vision (Beijing) Co., Ltd., Beijing (CN)

(72) Inventors: Shuai Yuan, Beijing (CN); Peidao Li, Beijing (CN); Na Zhao, Beijing (CN)

(73) Assignees: Beijing Zitiao Network Technology Co., Ltd., Beijing (CN); Douyin Vision (Beijing) Co., Ltd., Beijing (CN)

( * ) Notice: Subject to any disclaimer, the term of this patent is extended or adjusted under 35 U.S.C. 154(b) by 141 days.

(21) Appl. No.: 18/555,671

(22) PCT Filed: Jun. 30, 2023

(86) PCT No.: PCT/CN2023/104551
§ 371 (c)(1),
(2) Date: Oct. 16, 2023

(87) PCT Pub. No.: WO2024/012257
PCT Pub. Date: Jan. 18, 2024

(65) Prior Publication Data
US 2025/0077163 A1      Mar. 6, 2025

(30) Foreign Application Priority Data
Jul. 22, 2022    (CN) .......................... 202210817295.6

(51) Int. Cl.
G06F 3/04842        (2022.01)
G06F 3/16           (2006.01)

(52) U.S. Cl.
CPC ............ *G06F 3/16* (2013.01); *G06F 3/04842* (2013.01)

(58) Field of Classification Search
CPC ................................ G06F 3/16; G06F 3/04842
See application file for complete search history.

(56) References Cited

U.S. PATENT DOCUMENTS 6,188,008 B1       2/2001   Fukata
2006/0272486 A1*  12/2006  Chen ........................ G10H 1/42
                                                              84/637
(Continued)

FOREIGN PATENT DOCUMENTS

CN        101203904 A      6/2008
CN        105161081 A     12/2015
(Continued)

OTHER PUBLICATIONS

Jalal Possik et al., A model Based Systems Engineering Approach To Automated Music Arrangement, Jul. 19, 2021, Annual Modeling & Simulation Conference, pp. 1-12 (Year: 2021).*
(Continued)

*Primary Examiner* — Tam T Tran

(57) ABSTRACT

The present disclosure provides an audio processing method and apparatus, and an electronic device. The method includes: displaying a first interface, wherein the first interface includes a first chord of a first audio; triggering, in response to a triggering operation to the first interface, a modification to the first chord, and obtaining a second chord; and generating a second audio based on the second chord.

18 Claims, 18 Drawing Sheets

Displaying a first interface — S401

Triggering, in response to a triggering operation to the first interface, a modification to the first chord, and obtaining a second chord — S402

Generating a second audio based on the second chord — S403

(56) References Cited

U.S. PATENT DOCUMENTS

| | | | | |
|---|---|---|---|---|
| 2009/0064851 A1* | 3/2009 | Morris | ..................... | G10H 1/36 |
| | | | | 84/637 |
| 2010/0288108 A1 | 11/2010 | Jung et al. | | |
| 2016/0247496 A1* | 8/2016 | Pachet | ..................... | G10H 1/36 |
| 2023/0013536 A1* | 1/2023 | Walecka | .............. | G11B 27/031 |

FOREIGN PATENT DOCUMENTS

| | | | | |
|---|---|---|---|---|
| CN | 105390130 A | | 3/2016 | |
| CN | 105761713 A | | 7/2016 | |
| CN | 108346418 A | | 7/2018 | |
| CN | 105761713 B | * | 2/2020 | |
| CN | 112382257 A | | 2/2021 | |
| CN | 113535289 A | | 10/2021 | |

OTHER PUBLICATIONS

Matthias Mauch et al., Integrating Additional Chord Information Into HMM-Based Lyrics-to-Audio Alignment, Jan. 1, 2012, Transactions On Audio—Speech and Language Processing, vol. 20, No. 1, pp. 200-210 (Year: 2012).*

International Search Report and Written Opinion for International Application No. PCT/CN2023/104551, mailed Sep. 27, 2023, 13 Pages.

* cited by examiner

Displaying an audio processing window in response to a triggering operation to an audio processing control on a third interface $S1401$ Displaying the first interface in response to a triggering operation to a control in the audio processing window $S1402$

AUDIO PROCESSING METHOD AND APPARATUS, AND ELECTRONIC DEVICE

CROSS-REFERENCE TO RELATED APPLICATIONS

This application is a National Stage of International Application No. PCT/CN2023/104551, filed on Jun. 30, 2023, which claims priority to Chinese Patent Application No. 202210817295.6, filed on Jul. 12, 2022. Both of the applications are hereby incorporated by reference in their entireties.

TECHNICAL FIELD

Embodiments of the present disclosure relates to the field of audio processing technology, and in particular, to an audio processing method and apparatus, and an electronic device.

BACKGROUND

A user may use a music application program for music creation. For example, the user may use an arrangement function in the music application program to perform an arrangement on an audio piece.

Currently, through a music application program, accompaniment can be added to an audio piece, and an arrangement on the audio piece can be further conducted. For example, while using the music application program for humming an audio piece, a user may select a plurality of musical instruments in the music application program, such that the plurality of musical instrument can play accompaniment of the audio piece, thereby generating an arrangement piece. However, a current existing audio editing function is restricted, and flexibility of an arrangement is relatively low, which cannot satisfy requirements of a user for diversified and personalized media creation.

SUMMARY

The present disclosure provides an audio processing method and apparatus, and an electronic device, which are intended to address the technical problem that flexibility of an arrangement is relatively low in the prior art.

In a first aspect, the present disclosure provides an audio processing method, the method includes:

displaying a first interface, where the first interface includes a first chord of a first audio;

triggering, in response to a triggering operation to the first interface, a modification to the first chord, and obtaining a second chord; and generating a second audio based on the second chord.

In a second aspect, the present disclosure provides an audio processing apparatus, the audio processing apparatus includes a displaying module, a responding module and a generating module, where the displaying module is configured to display a first interface, the first interface includes a first chord of a first audio;

the responding module is configured to trigger, in response to a triggering operation to the first interface, a modification to the first chord, and obtain a second chord; and the generating module is configured to generate a second audio based on the second chord.

In a third aspect, an embodiment of the present disclosure provides an electronic device, including a processor and a memory, where the memory has, stored thereon, computer executable instructions;

where the processor executes the computer executable instructions stored on the memory, in such a manner that the processor implements the audio processing method according to the foregoing first aspect and various possibilities thereof.

In a fourth aspect, an embodiment of the present disclosure provides a computer readable storage medium on which computer executable instructions are stored. The computer executable instructions, when being executed by a processor, implement the audio processing method according to the foregoing first aspect and various possibilities thereof.

In a fifth aspect, an embodiment of the present disclosure provides a computer program product. The computer program product includes a computer program which, when being executed by a processor, implements the audio processing method according to the foregoing first aspect and various possibilities thereof.

In a sixth aspect, an embodiment of the present disclosure provides a computer program. The computer program, when being executed by a processor, implements the audio processing method according to the foregoing first aspect and various possibilities thereof.

The present disclosure provides an audio processing method and apparatus, and an electronic device. The electronic device displays a first interface, where the first interface includes a first chord of a first audio; triggers, in response to a triggering operation to the first interface, a modification to the first chord, and obtains a second chord; and generates a second audio based on the second chord.

BRIEF DESCRIPTION OF DRAWINGS

To describe the technical solutions in embodiments of the present disclosure or in the prior art more clearly, the following briefly introduces the accompanying drawings needed for describing the embodiments or the prior art. Apparently, the accompanying drawings in the following description illustrate merely some embodiments of the present disclosure, and those ordinary skilled in the art may still derive other drawings from these accompanying drawings without creative efforts.

DESCRIPTION OF EMBODIMENTS

Figure 1:
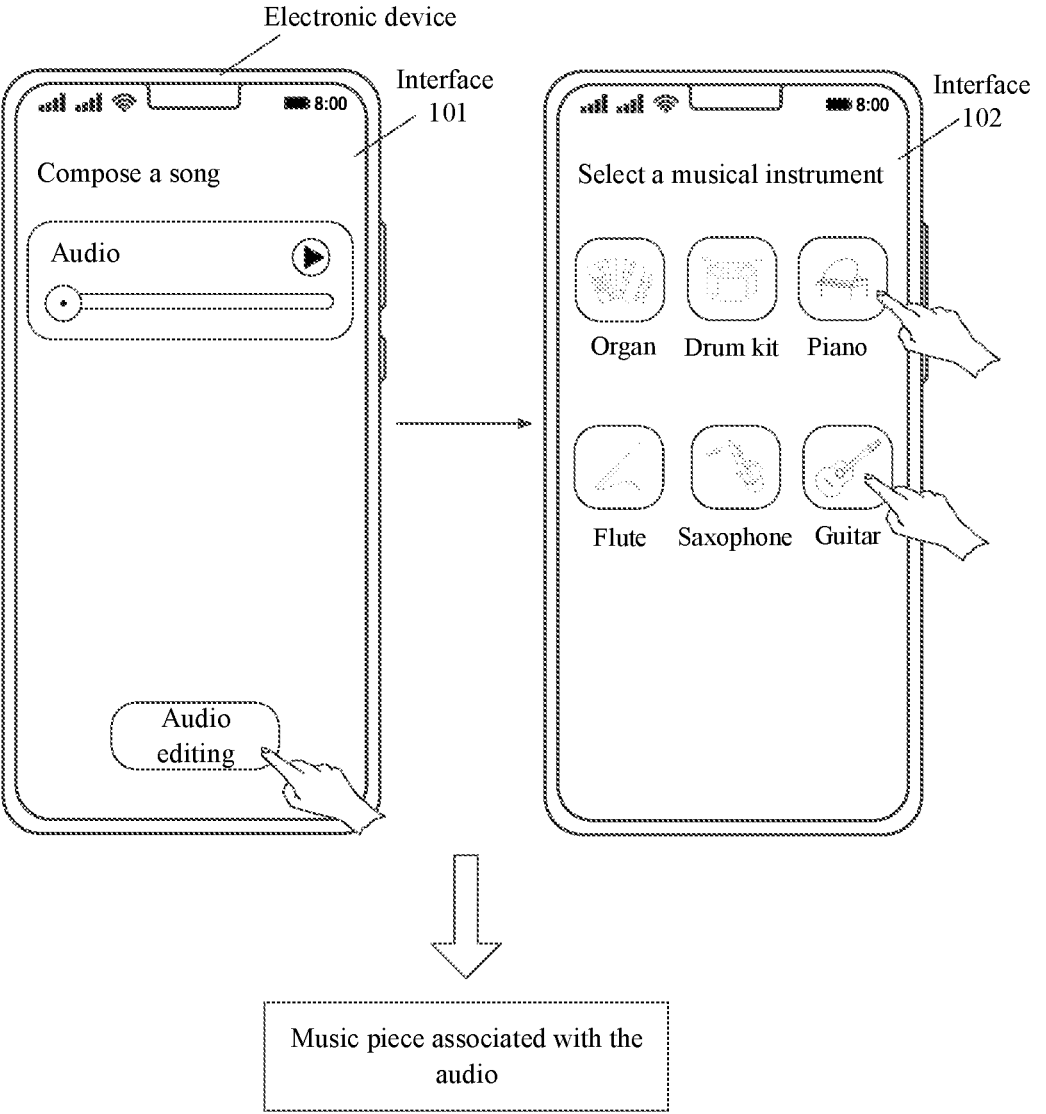
FIG. 1 is a schematic diagram of an arrangement according to an embodiment of the present disclosure.

Exemplary embodiments will be described in detail herein, and presented illustratively in the accompanying drawings. In the following description, when referring to the accompanying drawings, the same number in different drawings indicates the same or similar elements, unless otherwise indicated. The implementations described in the following exemplary embodiments do not represent all embodiments being consistent with the present disclosure. Rather, they are merely examples of apparatuses and methods being consistent with some aspects of the present disclosure as detailed in the appended claims.

For ease of understanding, the following explains the concepts referred to in the embodiments of the present disclosure.

Electronic device: an electronic device is a kind of device with a wireless transceiving function. The electronic device may be deployed on the land, including indoor or outdoor, handheld, wearable or on-board; or deployed on the water (such as a ship or the like). The electronic device may be a mobile phone (mobile phone), a tablet computer (Pad), a computer with a wireless transceiving function, a virtual reality (virtual reality, VR) electronic device, an augmented reality (augmented reality, AR) electronic device, a wireless terminal in industrial control (industrial control), a vehicle-mounted electronic device, a wireless terminal in self driving (self driving), a wireless electronic device in remote medical (remote medical), a wireless electronic device in a smart grid (smart grid), a wireless electronic device in transportation safety (transportation safety), a wireless electronic device in a smart city (smart city), a wireless electronic device in a smart home (smart home), a wearable electronic device, etc. The electronic device referred to in the embodiments of the present disclosure may also be referred to as a terminal, a user equipment (user equipment, UE), an access electronic device, a vehicle-mounted terminal, a terminal for industrial control, a UE unit, a UE station, a mobile station, a mobile platform, a remote station, a remote electronic device, a mobile device, a UE electronic device, a wireless communication device, a UE agent, a UE apparatus, etc. The electronic device may be fixed or mobile.

Chords: chords refer to a group of tones having a certain interval relationship. For example, a longitudinal combination of three or more notes in terms of a third or non-third degree superposition relationship is called a chord.

Music theory: music theory is an abbreviation for theory of music, which includes basic theory of low difficulty. For example, the music theory may include contents like notation reading, interval, chord, rhythm, meter, etc. The music theory may further include theory of high difficulty. For example, the music theory may include contents like harmony, polyphony, musical form, melody, orchestration, etc.

Arrangement: arrangement refers to a process of conducting orchestration on music based on music theory. For example, the arrangement may be a process of composing accompaniment and harmony for a music piece according to a major melody (meter) of the music and a style of the music piece that a composer wishes to express (cheerful, rock, etc.).

In conjunction with FIG. 1, an arrangement method in a prior art is described as follows.

FIG. 1 is a schematic diagram of arrangement according to an embodiment of the present disclosure. With reference to FIG. 1, an electronic device is contained. The electronic device includes a interface 101 and a interface 102, where the interface 101 includes thereon an audio to be edited and an audio editing control. In response to a click operation by a user to the audio editing control, the electronic device jumps from the interface 101 to the interface 102.

With reference to FIG. 1, the interface 102 includes icons of a plurality of musical instruments thereon. Among them, the icon of each musical instrument is associated with a tone of a type of musical instrument. In response to click operations by the user to the piano icon and the guitar icon, the electronic device can generate accompaniment synthesized with a piano and a guitar according to a meter of the audio to be edited, and further obtain, according to the accompaniment and the audio to be edited, a music piece associated with the audio.

In the embodiment as shown in FIG. 1, through a plurality of musical instruments selected by the user, the electronic device can synthesize the accompaniment of the audio to be edited, and further obtain an arranged music piece. However, the current audio editing function only allows a free selection of musical instruments for accompaniment, the audio editing function is restricted, and flexibility of an arrangement is relatively low, which cannot satisfy requirements of a user for diversified and personalized media creation.

To address the aforementioned technical problem, an embodiment of the present disclosure provides an audio processing method that allows for: displaying a first interface including a first chord of a first audio; displaying a recommendation window in response to a triggering operation to the first interface, where the recommendation window may include therein at least one set of candidate chords associated with the first chord; in response to a selection operation to one set of candidate chords of the at least one set of candidate chords, replacing the first chord with the one set of candidate chords, and obtaining a second chord; and generating a second audio based on the second chord. In this way, by means of the triggering operation to the first interface, a user can freely conduct modification to a chord being displayed on the first interface. Therefore, the user can conduct a personalized arrangement to the first audio, flexibility of the arrangement is improved, and requirements of the user for diversified editing to media is satisfied.

In conjunction with FIG. 2, an application scenario of an embodiment of the present disclosure is described as follows.

Figure 2:
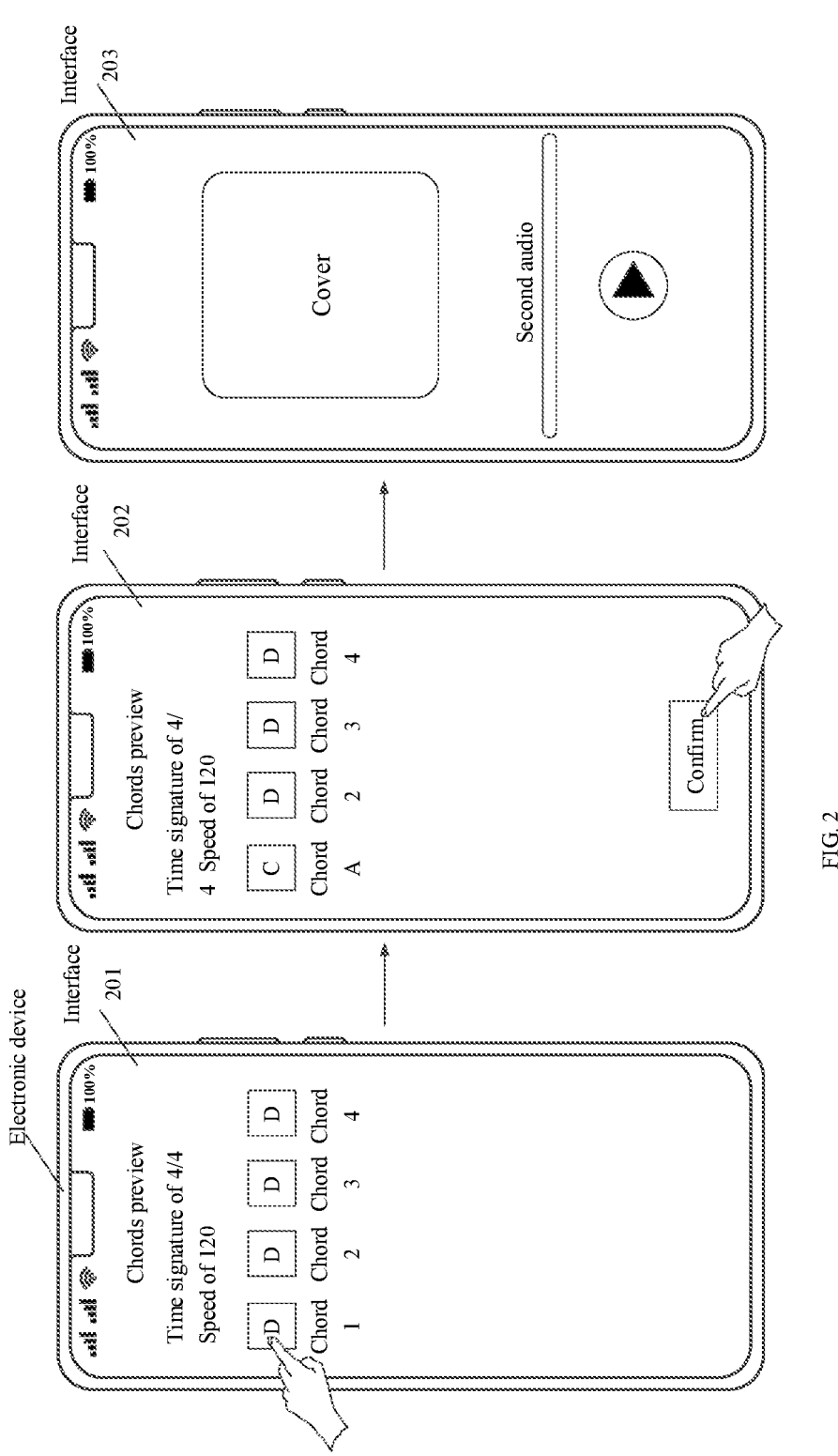
FIG. 2 is a schematic diagram of an application scenario according to an embodiment of the present disclosure.

FIG. 2 is a schematic diagram of an application scenario according to an embodiment of the present disclosure. With reference to FIG. 2, an electronic device is contained. The electronic device includes a interface 201, a interface 202 and a interface 203. Displayed in the interface 201 are a chord 1, chord 2, chord 3, and chord 4 (chords: D, D, D, D are only exemplary representations, and the chords mentioned hereunder in the embodiments of the present disclosure are also exemplary representations rather than chords actually applied) of the first audio. After modifying the chord 1, the electronic device performs update to the interface 201, and displays the interface 202.

With reference to FIG. 2, included on the interface 202 are a chord A, chord 2, chord 3, and chord 4 (chords: C, D, D, D), and a confirmation control. Among them, the chord A is the modified chord of the chord 1. In response to a click operation to the confirmation control, the electronic device jumps from the interface 202 to the interface 203.

With reference to FIG. 2, included on the interface 203 is a playing interface of a second audio associated with the first audio. The chords of the first audio are the chord 1, chord 2, chord 3, and chord 4, and the chords of the second audio are the chord A, chord 2, chord 3, and chord 4. In this way, by means of a touching operation to the interface 201, the user can freely modify the chords of the first audio, therefore, the flexibility of the arrangement is improved.

In conjunction with FIG. 3, another application scenario of an embodiment of the present disclosure is described as follows.

Figure 3:
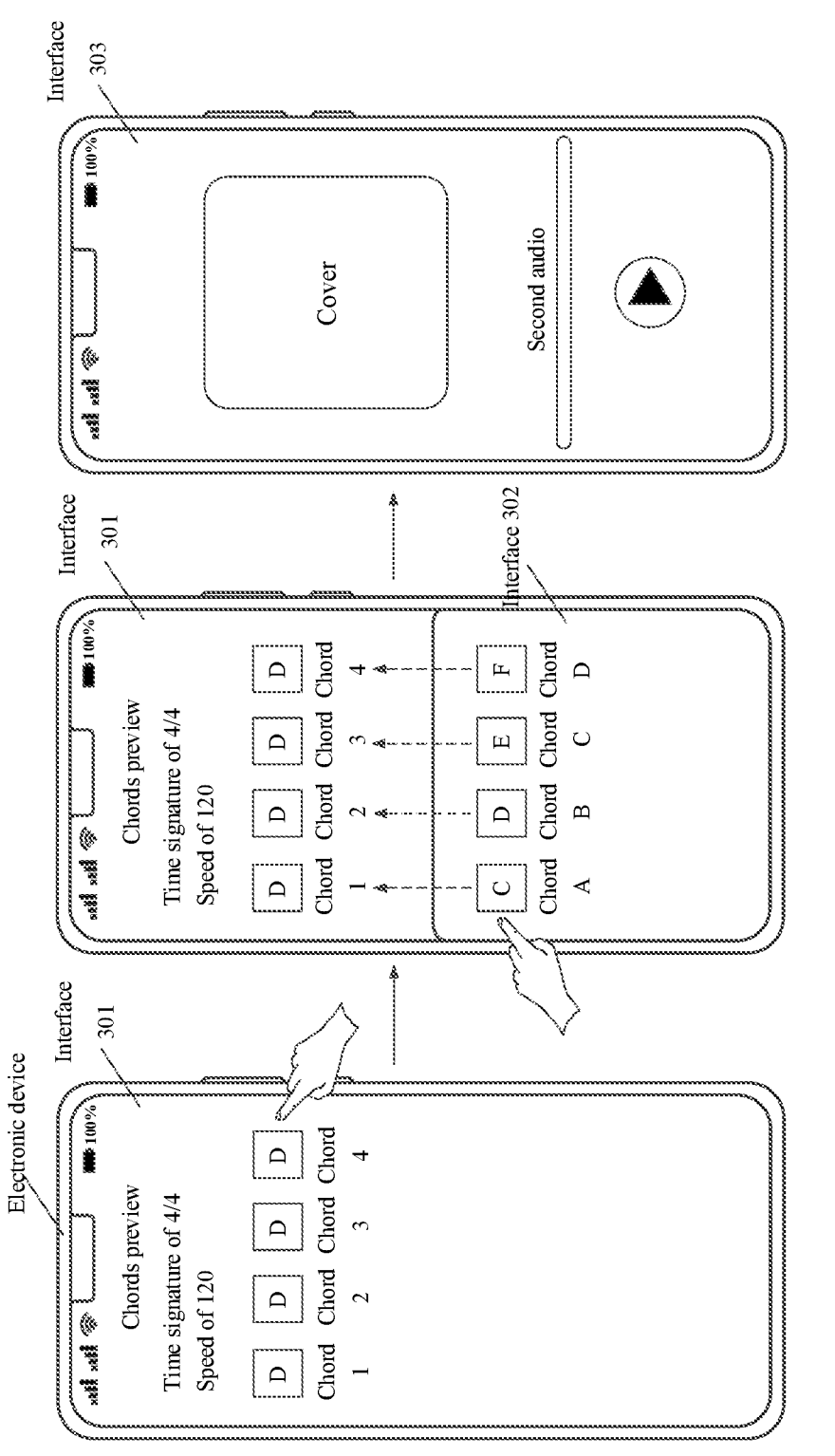
FIG. 3 is a schematic diagram of another application scenario according to an embodiment of the present disclosure.

FIG. 3 is a schematic diagram of another application scenario according to an embodiment of the present disclosure. With reference to FIG. 3, an electronic device is contained. The electronic device includes a interface 301, a interface 302 and a interface 303. Displayed on the interface 301 is a set of 4-beat chords of the first audio, and the set of chords includes a chord 1, chord 2, chord 3, and chord 4. In response to a replacing operation to a set of first chords, the electronic device displays the interface 302 in the interface 301.

With reference to FIG. 3, contained on the interface 302 is a further set of chords, the set of chords includes a chord A, chord B, chord C, and chord D, and a confirmation control. In response to a selection operation to the further set of chords in the interface 302, modify the one set of 4-beat chords of the first audio as the further set of chords. The chord A is the modified chord of the chord 1, the chord B is the modified chord of the chord 2, the chord C is the modified chord of the chord 3, and the chord D is the modified chord of the chord 4. In response to a click operation to the confirmation control in interface 301, the electronic device jumps from interface 301 to interface 303.

With reference to FIG. 3, included on the interface 303 is a second audio. The second audio is an audio obtained based on the chord A, chord B, chord C, and chord D. In this way, by means of a touching operation to the interface 301, the user can modify a set of chords of the first audio, to make the modified chords conform with music theory, thereby improving the effect of the arrangement. Moreover, the user can freely modify the chords in the first audio, therefore, the flexibility of the arrangement is improved.

The technical solutions of the present disclosure and how the technical solutions of the present disclosure address the mentioned technical problem will be explained in detail in the following with specific embodiments. The following specific embodiments may be combined with each other, and a same or similar concept or process may not be repeated in some embodiments. Embodiments of the present disclosure will be described hereunder in conjunction with the accompanying drawings.

Figure 4:
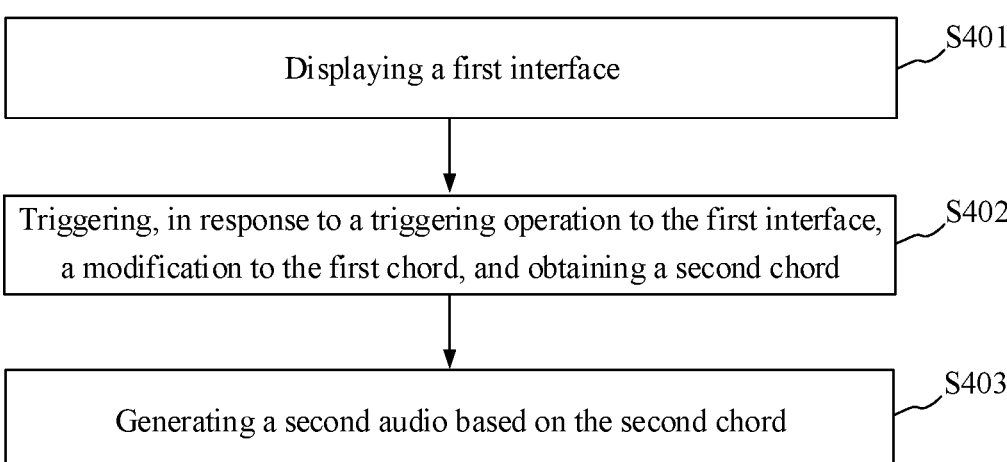
FIG. 4 is a schematic flowchart of an audio processing method according to an embodiment of the present disclosure.

FIG. 4 is a schematic flowchart of an audio processing method according to an embodiment of the present disclosure. With reference to FIG. 4, the method may include:

S401, displaying a first interface.

The executing subject of the embodiments of the disclosure may be an electronic device, or an audio processing apparatus provided in the electronic device. The audio processing apparatus can be implemented through software, and the audio processing apparatus can also be implemented through a combination of software and hardware.

In an implementation, the first interface includes thereon a first chord of a first audio. For example, the electronic device can obtain the first audio through voice input by a user. For example, the electronic device may obtain a music piece hummed by the user and determine the music piece to be the first audio. For example, after obtaining the voice input by the user, the electronic device can perform an operation such as cropping or editing to obtain the first audio. For example, after obtaining the voice input by the user, the electronic device crops a segment of the voice and determines the segment to be the first audio.

In an implementation, the electronic device can obtain the first audio from a database. For example, a plurality of audio files may be stored in the database of the electronic devices, and the electronic device can obtain the first audio from the plurality of audio files according to a user operation. For example, the electronic device can display an audio acquiring interface, and the audio acquiring interface includes an audio file A, audio file B, and audio file C thereon. If the user clicks on the audio file A, the electronic device determines an audio associated with the audio file A to be the first audio. If the user clicks on the audio file B, the electronic device determines an audio associated with the audio file B to be the first audio.

In an implementation, the first chord may be a chord to be modified in the first audio. For example, the first audio may include 20 chords, and if 10 of them are chords to be modified, these 10 chords are first chords in the first audio, and the electronic device may display, on the first interface, these 10 chords to be modified.

In an implementation, the first chord on the first interface may be a single chord or a set of chords, which is not limited in the embodiments of the present disclosure. For example, the first chord displayed on the first interface may be a single chord or a set of chords, and the number of chords in each set of first chords is the same as a meter of the first audio. For example, if the first audio is an audio with a time signature of 4/4, a set of first chords includes 4 chords.

In an implementation, the first interface may include thereon the first chord and a chord that needs no modification in the first audio. For example, the first audio includes 20 chords, and if 10 of them need to be modified, the electronic device may display, on the first interface, 10 chords to be modified and 10 chords that do not need modification. In an implementation, the electronic device can determine the first chord based on a triggering operation to a chord in the first audio by the user, it may also determine the first chord based on any other practical implementation, which is not limited in the embodiments of the present disclosure.

In an implementation, a chord displayed on the first interface may be a chord from a vocal segment of the first audio. For example, the chord displayed on the first interface may be a chord extracted by the electronic device based on a vocal segment of the first audio. For example, if a set of chords from the vocal segment in the first audio is D, D, D, D, the first chords associated with the vocal segment which are displayed on the first interface may be D, D, D, D.

In an implementation, a chord displayed on the first interface may be an updated chord of the chord from the vocal segment of the first audio. For example, in a practical application, the first audio hummed by the user may not conform with music theory. Therefore, when displaying chords of the first audio (which may be the first chords or the chords in the first audio that do not need modification) on the first interface, the electronic device may update a chord that does not conform with music theory to make the chord that does not conform with music theory conform with music theory, and subsequently display chords that conform with music theory on the first interface.

In conjunction with FIG. 5, the first interface is described as follows.

Figure 5:
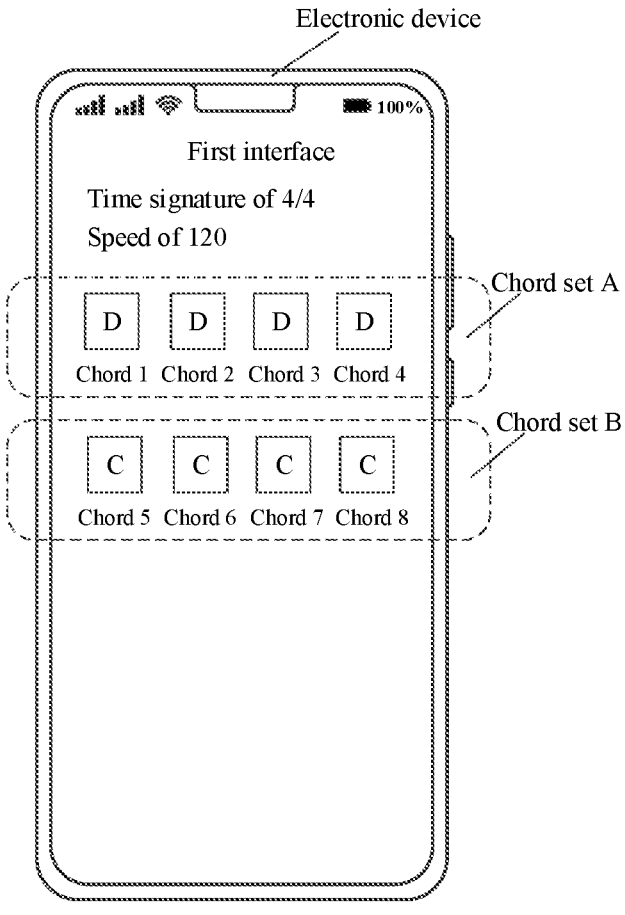
FIG. 5 is a schematic diagram of a first interface according to an embodiment of the present disclosure.

FIG. 5 is a schematic diagram of a first interface according to an embodiment of the present disclosure. With reference to FIG. 5, an electronic device is contained. A display interface of the electronic device is the first interface. Included on the first interface are a chord set A and a chord set B. Each of the chord sets includes 4 chords. For example, the chord set A includes a chord 1, chord 2, chord 3, and chord 4, and the chord set B includes a chord 5, chord 6, chord 7, and chord 8. If the chords in the chord set A are chords to be modified, each of the chords in the chord set A on the first interface is the first chord.

S402, triggering, in response to a triggering operation to the first interface, a modification to the first chord, and obtaining a second chord.

In an implementation, the triggering operation may be a click operation. For example, when the user clicks on the first chord on the first interface, the electronic device may trigger the operation of modification to the first chord. For example, the triggering operation may also be a long press operation. For example, when the user performs a long press on the first chord on the first interface, the electronic device may trigger the operation of modification to the first chord. The triggering operation may also be any other operation such as a voice operation, which is not limited in the embodiments of the present disclosure.

In an implementation, the second chord is a modified chord of the first chord. For example, the first chord is in a D key, if the first chord is modified to a C key, the second chord associated with the first chord is the modified C key. If the first chord is modified to an A key, the second chord associated with the first chord is the modified A key.

In an implementation, the following practical implementations may be used to trigger the modification to the first chord, and obtain the second chord: in response to the triggering operation to the first interface, displaying at least one set of candidate chords associated with the first chord, and in response to a selection operation to the at least one set of candidate chords, obtaining the second chord. In an implementation, the number of chords in a set of candidate chords is associated with a meter of the first audio. For example, if a meter of the first audio is 4 beats, 4 chords form a set of chords, and a set of candidate chords also includes 4 candidate chords.

In an implementation, a candidate chord is a chord associated with the vocal segment of the first audio. For example, when the first chord is displayed on the first interface, if the first chord is a chord from the vocal segment of the first audio, the candidate chord of the first chord may be a chord having a relatively high matching level with a chord from the vocal segment.

In an implementation, the first chord is determined based on a vocal segment in the first audio, and the at least one set of candidate chords is determined through the following steps: determining plural sets of matching chords that match the vocal segment and corresponding matching levels. In an implementation, a matching chord is a chord which is associated with the vocal segment and conforms with music theory. For example, if the chords from the vocal segment in the first audio are D, D, D, D, and they do not conform with musical theory, the matching chords may be D, A, D, D, or D, C, D, D, or other chords that conform with music theory. In an implementation, a matching level may be a matching level between a matching chord and a chord from the vocal segment. For example, the matching level may be a similarity level between an audio feature of the matching chord and an audio feature of the chord from the vocal segment.

In an implementation, the following practical implementations may be used to determine the plural sets of matching chords that match the vocal segment and the corresponding matching levels: performing processing on the vocal segment through a preset model, and obtaining the plural sets of matching chords corresponding to the vocal segment and the corresponding matching levels. In an implementation, the preset model is obtained by learning based on plural sets of samples. The plural sets of samples include vocal segment samples, matching chords samples associated with the vocal segment samples, and matching levels associated with the respective matching chords samples and the vocal segment samples.

Determining the at least one set of candidate chords from the plural sets of matching chords according to the matching levels. For example, the electronic device may determine a matching chord having a matching level that is greater than a preset threshold to be a candidate chord. For example, the electronic device may determine a matching chord of which a matching level with the vocal segment is greater than 70% to be a candidate chord. For example, the electronic devices may determine a plurality of matching chords having the highest matching levels to be candidate chords. For example, the electronic device may determine, from the plurality of matching chords, 3 matching chords having the highest matching levels, and determine the 3 matching chords having the highest matching levels to be the candidate chords.

In an implementation, the first interface includes thereon an editing control associated with the first chord, and displaying, in response to the triggering operation to the first interface, the at least one set of candidate chords associated with the first chord specifically refers to: displaying in a recommendation window, in response to a triggering operation to the editing control on the first interface, the at least one set of candidate chords associated with the first chord. For example, when the user clicks on the editing control associated with the first chord, the electronic device can display the recommendation window for the first chord, and the recommendation window includes therein the at least one set of candidate chords associated with the first chord.

In conjunction with FIG. 6, the process of displaying the recommendation window is described as follows.

Figure 6:
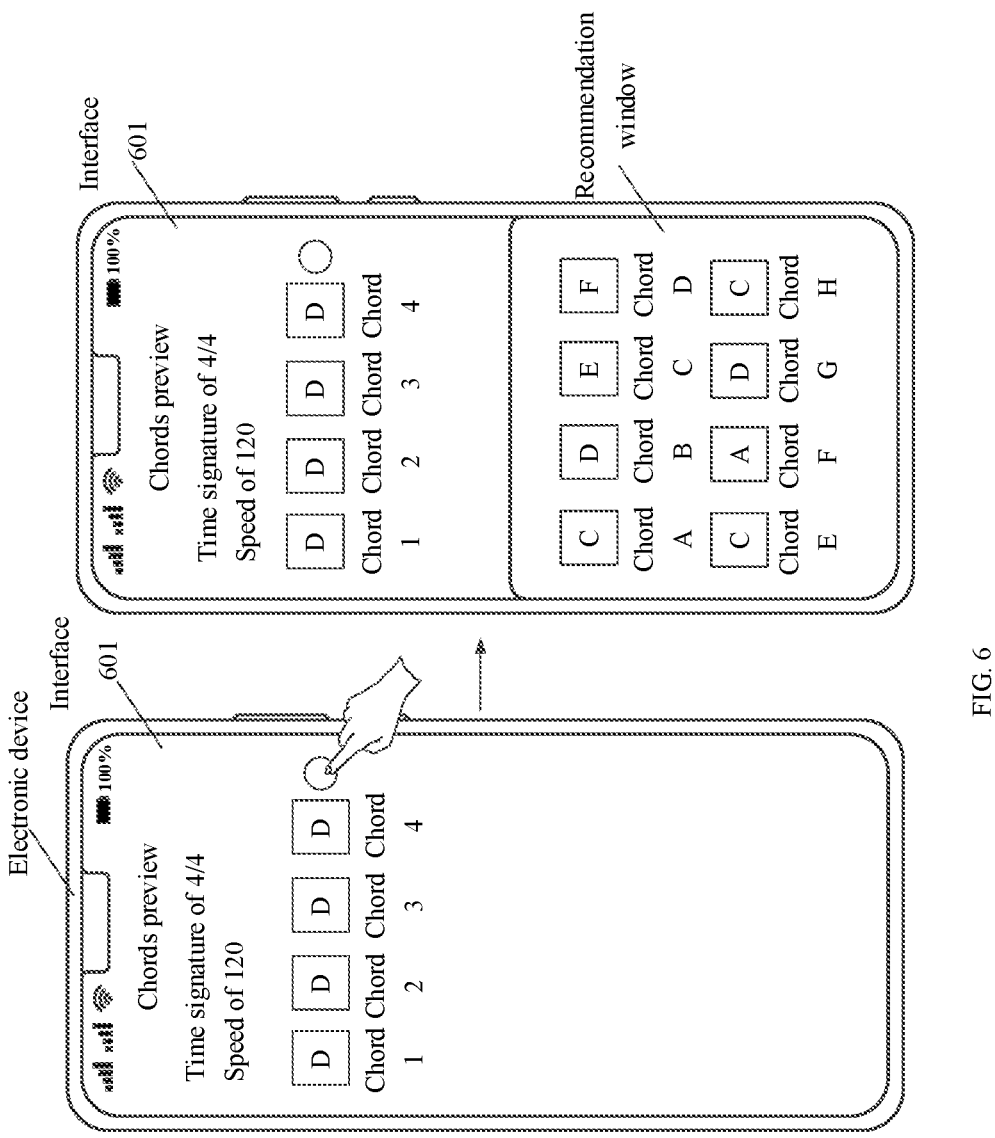
FIG. 6 is a schematic diagram of a process of displaying a recommendation window according to an embodiment of the present disclosure.

FIG. 6 is a schematic diagram of a process of displaying a recommendation window according to an embodiment of the present disclosure. With reference to FIG. 6, an electronic device is contained. The electronic device includes a interface 601 and a recommendation window. Included on the interface 601 is a set of first chords (a chord 1, chord 2, chord 3, and chord 4), and an editing control corresponding to the set of first chords. When the user clicks on the editing control, the recommendation window pops up in interface 601.

With reference to FIG. 6, the recommendation window for the set of first chords pops up at the bottom of interface 601. The recommendation window includes therein 2 sets of candidate chords associated with the first chords, and each set of candidate chords includes 4 chords. For example, the first set of candidate chords includes a chord A, chord B, chord C, and chord D, and the second set of candidate chords includes a chord E, chord F, chord G, and chord H.

In an implementation, obtaining the second chord in response to the selection operation to the one set of candidate chords in the at least one set of candidate chords specifically refers to: in response to a triggering operation to the one set of candidate chords in the at least one set of candidate chords, highlighting the one set of candidate chords in a recommendation window. For example, the highlighting may refer to marking a set of candidate chords, framing a set of candidate chords, etc.

In conjunction with FIG. 7A-FIG. 7B, the process of highlighting a set of candidate chords is described as follows.

Figure 7A:
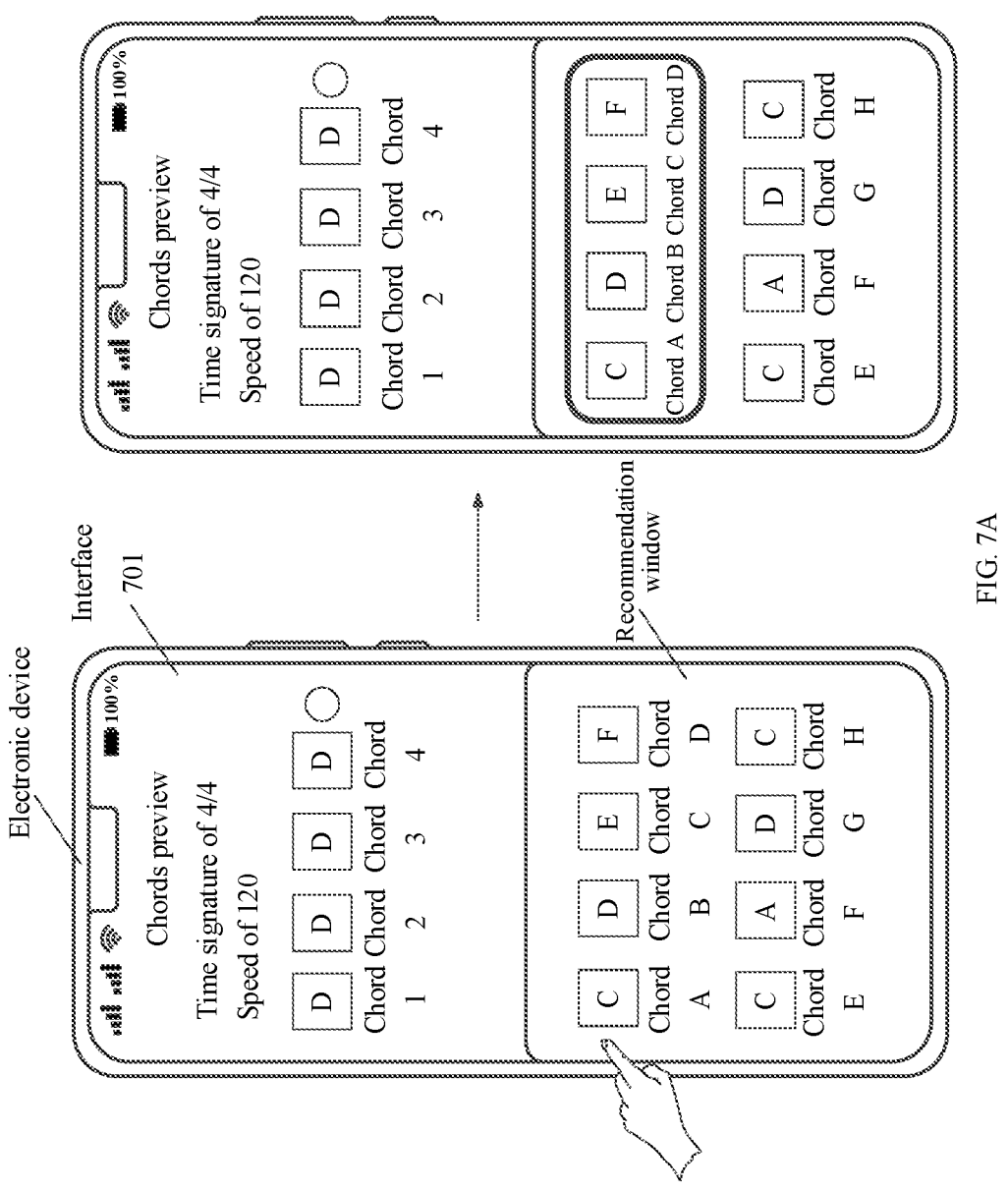
FIG. 7A is a schematic diagram of highlighting one set of candidate chords according to an embodiment of the present disclosure.

FIG. 7A is a schematic diagram of highlighting one set of candidate chords according to an embodiment of the present disclosure. With reference to FIG. 7A, an electronic device is contained. The electronic device displays a interface 701. Included on the interface 701 are a set of first chords (a chord 1, chord 2, chord 3, and chord 4), and a recommendation window associated with the set of first chords. Included in the recommendation window are 2 sets of candidate chords. Among them, the first set of candidate chords are a chord A, chord B, chord C, and chord D, and the second set of candidate chords are a chord E, chord F, chord G, and chord H. When the user clicks on the first set of candidate chords, a selection box is displayed in the recommendation window on the interface 701. The selection box is displayed around the first set of candidate chords to highlight the first set of candidate chords, so that the user can determine the candidate chords to be clicked on, thereby improving the interaction between the user and the electronic device.

Figure 7B:
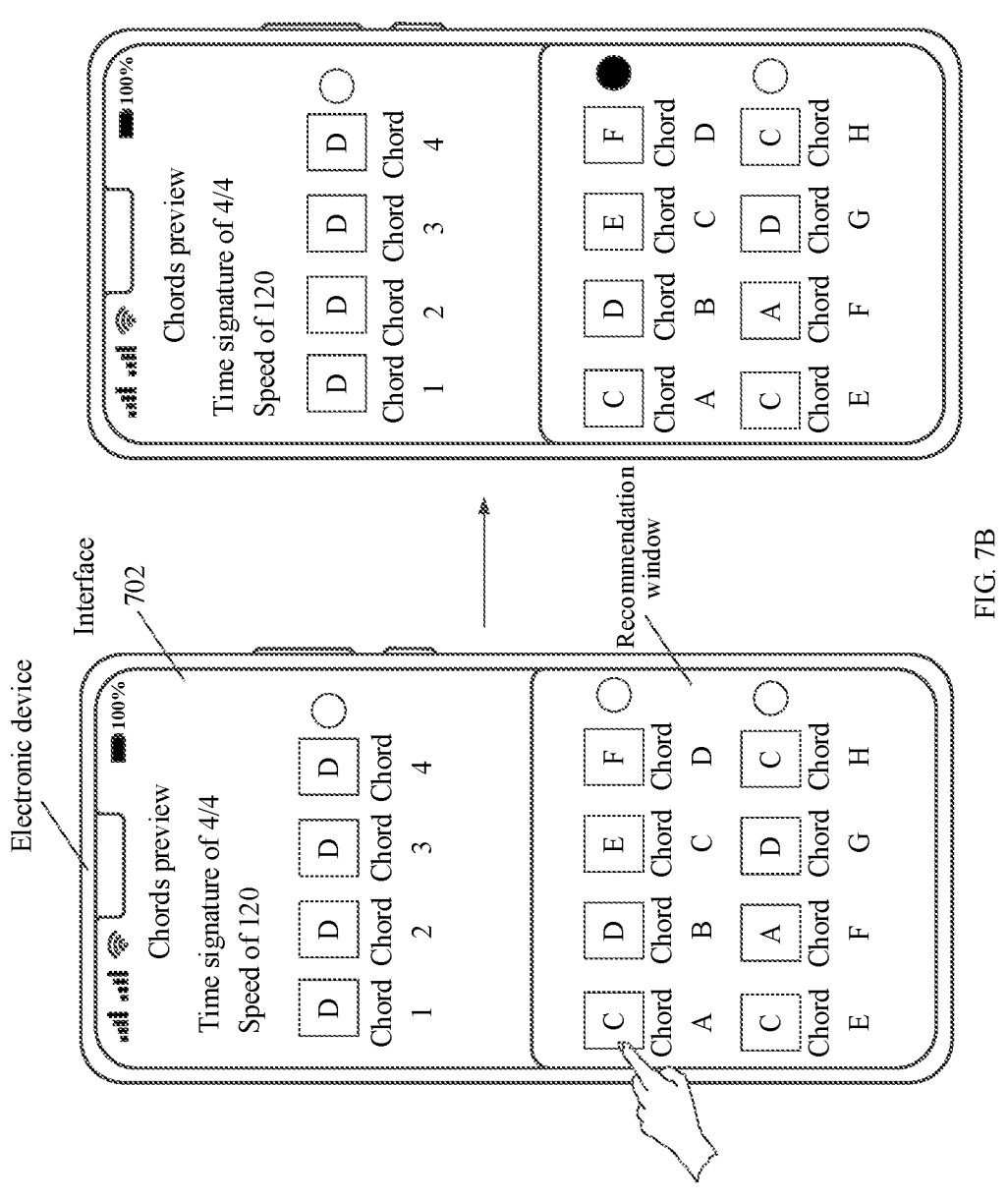
FIG. 7B is another schematic diagram of highlighting one set of candidate chords according to an embodiment of the present disclosure.

FIG. 7B is another schematic diagram of highlighting one set of candidate chords according to an embodiment of the present disclosure. With reference to FIG. 7B, an electronic device is contained. The electronic device displays a interface 702. Included on the interface 702 are a set of first chords (a chord 1, chord 2, chord 3, and chord 4), and a recommendation window associated with the set of first chords. Included in the recommendation window are 2 sets of candidate chords and corresponding selection controls thereof. Among them, the first set of candidate chords includes a chord A, chord B, chord C, and chord D, and the second set of candidate chords includes a chord E, chord F, chord G, and chord H. When the user clicks on the first set of candidate chords (either by clicking on a selection control or by clicking on the candidate chords instead of the selection control, which is not limited in the embodiments of the present disclosure), the selection control of the first set of candidate chords is explicitly marked in the recommendation window on the interface 702 to highlight the first set of candidate chords.

In response to a triggering operation to a confirmation control in the recommendation window, cancel displaying the first chord on the first interface, display the one set of candidate chords at a position of the first chord, and obtain the second chord. For example, after the user selects a set of candidate chords, if the user clicks on the confirmation control in the recommendation window, the electronic device replaces first chords on the first interface with the candidate chords selected by the user.

In conjunction with FIG. 8, the process of displaying one set of candidate chords is described as follows.

Figure 8:
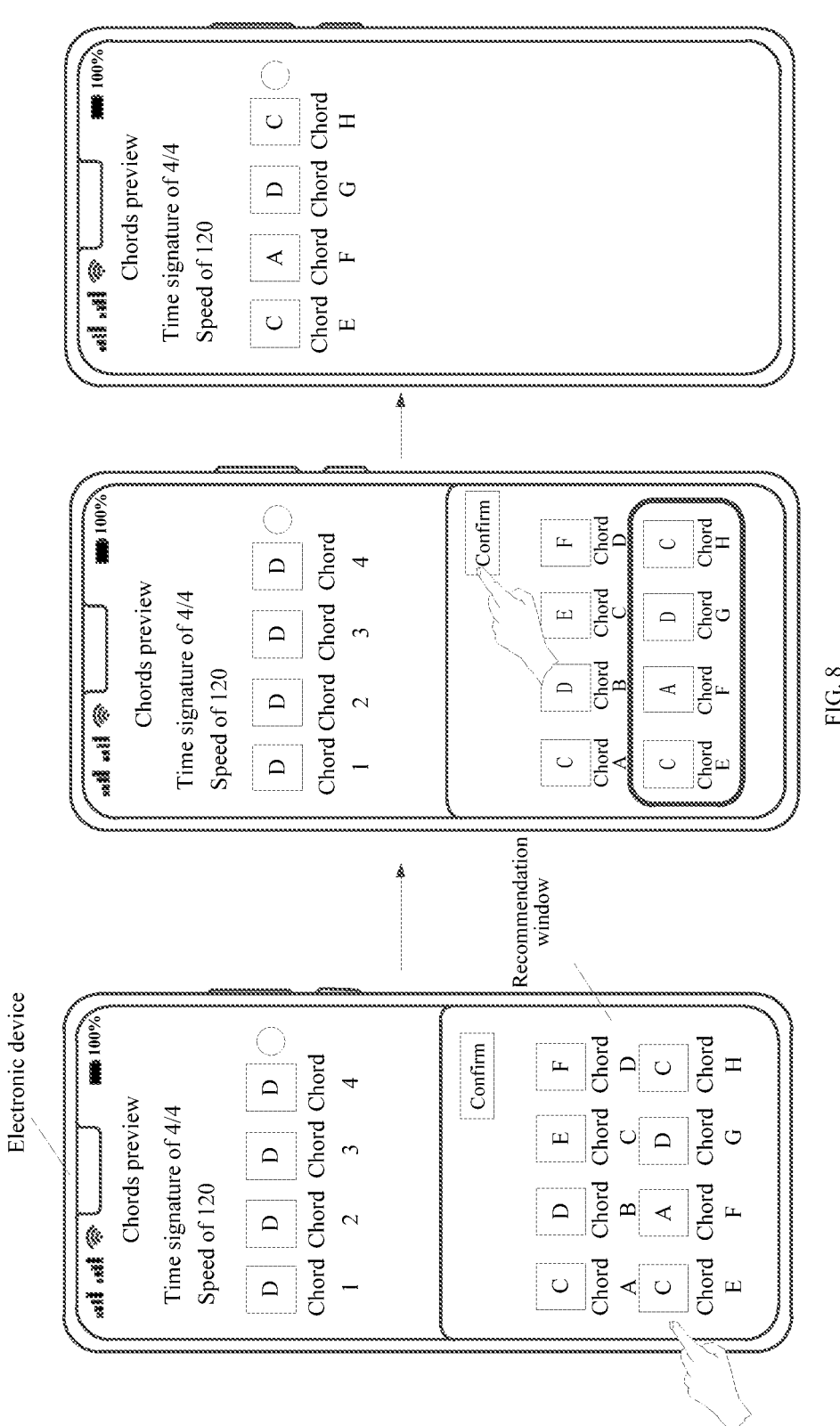
FIG. 8 is a schematic diagram of a process of displaying one set of candidate chords according to an embodiment of the present disclosure.

FIG. 8 is a schematic diagram of a process of displaying one set of candidate chords according to an embodiment of the present disclosure. With reference to FIG. 8, an electronic device is contained. Included on a display interface of the electronic device are a set of first chords, and a recommendation window associated with the set of first chords. The set of first chords includes a chord 1, chord 2, chord 3, and chord 4. Included in the recommendation window are 2 sets of candidate chords associated with the set of first chords and a confirmation control. The first set of candidate chords includes a chord A, chord B, chord C, and chord D, and the second set of candidate chords includes a chord E, chord F, chord G, and chord H.

With reference to FIG. 8, when the user clicks on the second set of candidate chords, a selection box is displayed around the second set of candidate chords to highlight the second set of candidate chords. When the user clicks on the confirmation control, the electronic device cancels displaying the recommendation window and replaces the chord 1, chord 2, chord 3, and chord 4 on the display interface with the chord E, chord F, chord G, and chord H. In this way, since the candidate chords are chords that conform with music theory better, the effect of an arrangement is improved, moreover, the user can freely modify the chords of the first audio, therefore, the flexibility of the arrangement is improved.

S403, generating a second audio based on the second chord.

In an implementation, the electronic device may generate the second audio based on the second chord and an unmodified chord in the first audio. For example, the first audio includes 20 chords, and if 10 of them are modified, the electronic device obtains 10 second chords. The electronic device can generate the second audio based on the 10 second chords and the 10 unmodified chords.

In an implementation, the first interface includes an arrangement control, and the electronic device may generate the second audio based on the following practical implementation: in response to a triggering operation to the arrangement control, displaying an arrangement interface. For example, after modifying the first chord(s) on the first interface, the user can click on the arrangement control on the first interface, and the electronic device can jump from the first interface to the arrangement interface. In an implementation, the arrangement interface includes an arrangement style control and an audio generating control. The arrangement style control is used to indicate a plurality of musical instruments required for accompaniment of the second audio. For example, the arrangement style interface includes thereon a plurality of arrangement style controls, and when different arrangement style controls are selected by the user, different musical instruments are used for the accompaniment of the second audio. For example, musical instruments associated with a rock arrangement style control include a drum kit, a bass, and a guitar, and musical instruments associated with a classic pop arrangement style control include a guitar, a piano, and an organ.

In response to a triggering operation to the arrangement style control, determine an arrangement style type of the second audio. For example, if the user clicks on the rock arrangement style control, the arrangement style type of the second audio is a rock style. If the user clicks on the classic pop arrangement style control, the arrangement style type of the second audio is a classic pop style. If the user clicks on an electropop arrangement style control, the arrangement style type of the second audio is electropop. In this way, by means of binding a plurality of musical instruments to obtain an arrangement style control, a user can quickly select musical instruments for accompaniment of the second audio, thereby reducing the complexity of the user's selection for a musical instrument, and allowing a user without knowledge of music theory to perform an arrangement, and improving user experience.

In response to a triggering operation to the audio generating control, generate the second audio based on the second chord and the arrangement style type. For example, the arrangement style type of the second audio is a rock type, if the user clicks on the audio generating control, the electronic device uses a drum kit, a bass and a guitar required for the rock type, and the second chord, to generate the second audio.

In an implementation, the arrangement interface may further include thereon an emotion type control. For example, when the user selects different emotion type controls on the arrangement interface, there will be different emotions for the accompaniment of the second audio. For example, if the user selects a sadness emotion control, the accompaniment of the second audio will have a relatively slow rhythm. If the user selects a cheerfulness emotion control, the accompaniment of the second audio will have a relatively fast rhythm. In an implementation, the electronic device can also generate the second audio according to the arrangement style control and the emotion type control and the second chord. For example, the electronic device determines an arrangement style of the second audio according to a click operation by the user to the arrangement style control, determines an arrangement emotion of the second audio according to a triggering operation by the user to the emotion type control, and further generates the second audio according to the arrangement style and the arrangement emotion and the second chord.

In conjunction with FIG. 9, the process of generating the second audio is described as follows.

Figure 9:
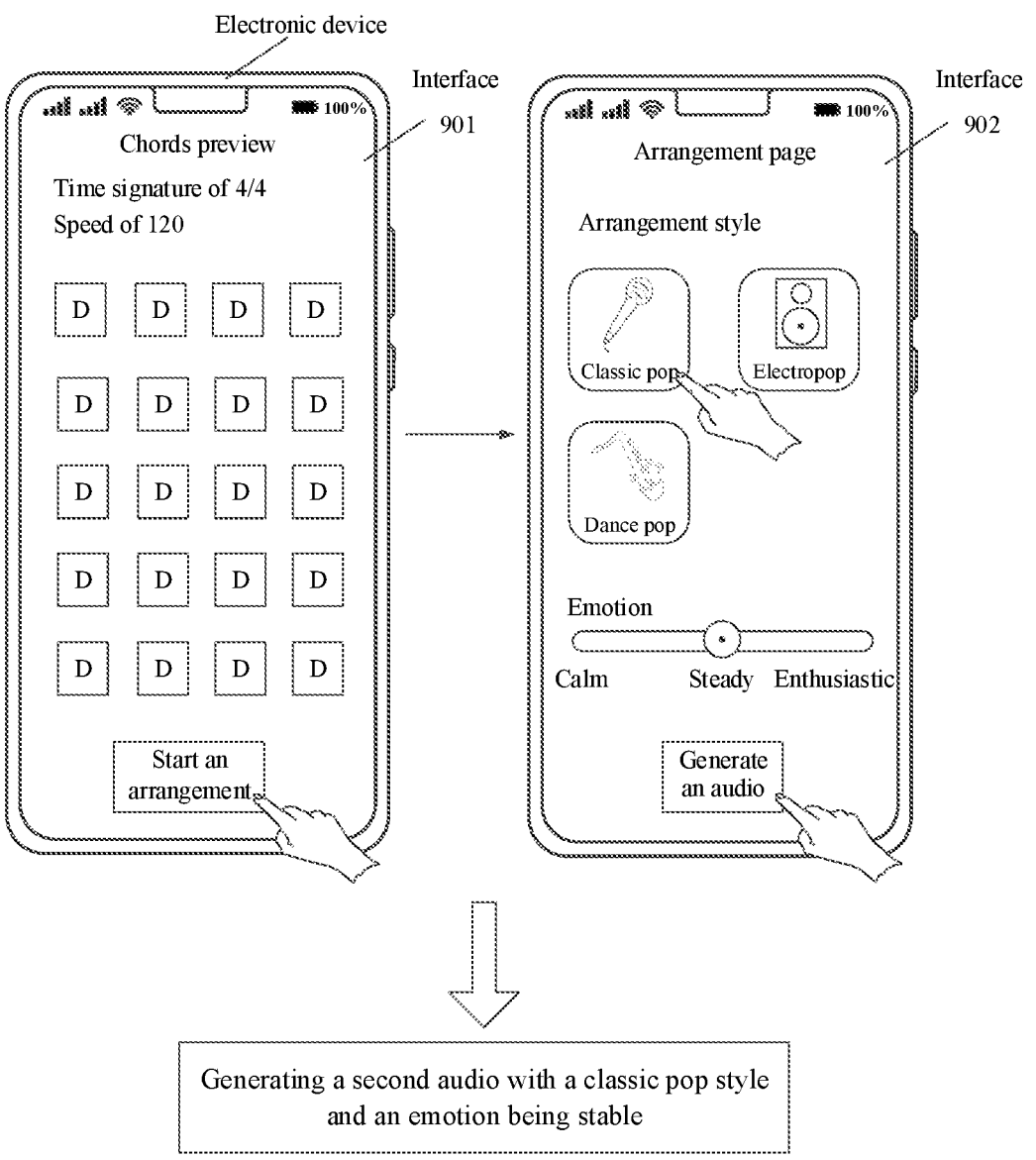
FIG. 9 is a schematic diagram of a process of generating a second audio according to an embodiment of the present disclosure.

FIG. 9 is a schematic diagram of a process of generating a second audio according to an embodiment of the present disclosure. With reference to FIG. 9, an electronic device is contained. Display interfaces of the electronic device include a interface 901 and a interface 902. Included on the interface 901 are plural sets of chords (for the convenience of description, the chords as shown in FIG. 9 are all in a D key) and an arrangement starting control. When the user clicks on the arrangement starting control on the interface 901, the electronic device jumps from the interface 901 to the interface 902.

With reference to FIG. 9, included on the interface 902 are an arrangement style control, an emotion control and an audio generating control. The arrangement style control may include a classic pop control, an electropop control, and a dance pop control. The emotion type control may have emotions ranging from calm to steady to enthusiastic.

With reference to FIG. 9, when the user clicks on the classic pop control, the electronic device determines that an arrangement style is the classic pop style. When the user swipes the emotion type control to steady, the electronic device determines that an arrangement emotion is steady. When the user clicks on the audio generating control, the electronic device generates, based on plural sets of chords, the second audio with a classic pop style and an emotion being stable. In this way, even for a user without knowledge of music theory, the user can quickly select a plurality of musical instruments for the arrangement to perform the arrangement on the audio, thereby reducing the complexity of the user's selection for a musical instrument, and improving the effect of the arrangement and the flexibility of the arrangement.

An embodiment of the present disclosure provides an audio processing method that allows for: displaying a first interface including a first chord of a first audio; displaying a recommendation window in response to a triggering operation to the first interface, where the recommendation window may include therein at least one set of candidate chords associated with the first chord; in response to a triggering operation to one set of candidate chords of the at least one set of candidate chords, highlighting the one set of candidate chords in the recommendation window; in response to a triggering operation to a confirmation control in the recommendation window, cancelling displaying the first chord on the first interface, displaying the one set of candidate chords at a position of the first chord, and obtaining the second chord; and generating the second audio based on the second chord. In this way, by means of the triggering operation to the first interface, the user can freely conduct modification to a chord being displayed on the first interface, such that the user can conduct the arrangement to the first audio at will, thereby improving the flexibility of the arrangement.

An embodiment of the present disclosure further includes a method for displaying a playing interface of a second audio. Based on the embodiment as shown in FIG. 2, in conjunction with FIG. 10, the method for displaying a playing interface of a second audio is described as follows.

Figure 10:
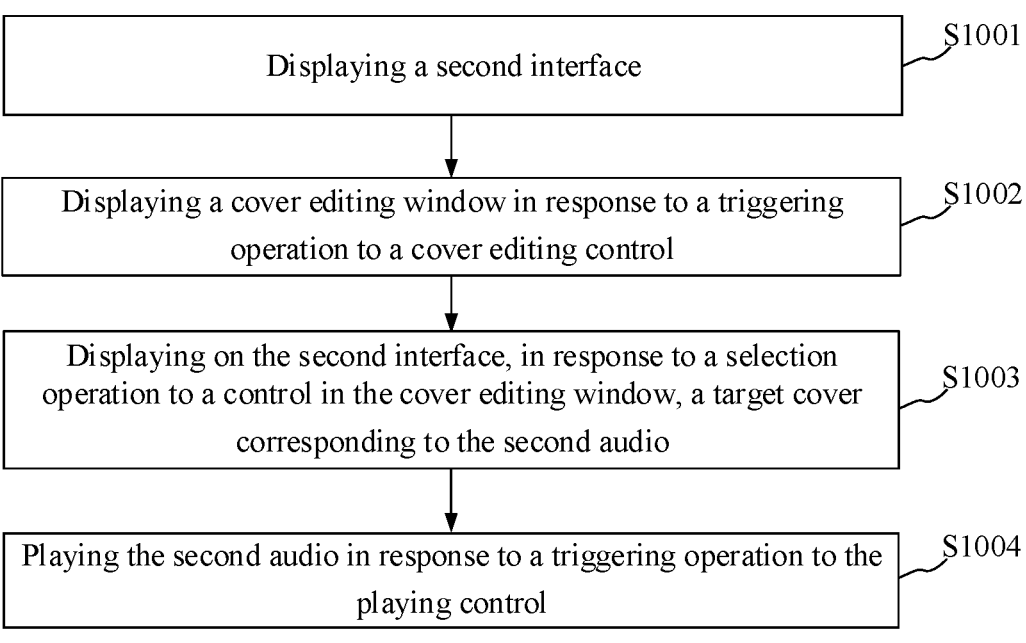
FIG. 10 is a schematic diagram of displaying a playing interface of a second audio according to an embodiment of the present disclosure.

FIG. 10 is a schematic diagram of displaying a playing interface of a second audio according to an embodiment of the present disclosure. With reference to FIG. 10, the process of the method includes:

S1001, displaying a second interface.

In an implementation, the second interface may be a playing interface of the second audio. For example, after the user performs a click operation on the audio generating control on the arrangement interface, the electronic device may jump from the arrangement interface to the playing interface of the second audio. In an implementation, the second interface includes a cover editing control and a playing control. For example, the cover editing control is used to edit a cover of the second audio. For example, upon a click on the cover editing control by the user, a cover image of the second audio and an animation effect of the cover image can be selected, and then the edited cover of the second audio is displayed on the second interface. In an implementation, the playing control is used to play the second audio. For example, when the user clicks on the playing control, the second audio is played on the second interface.

In conjunction with FIG. 11, the second interface is described as follows.

Figure 11:
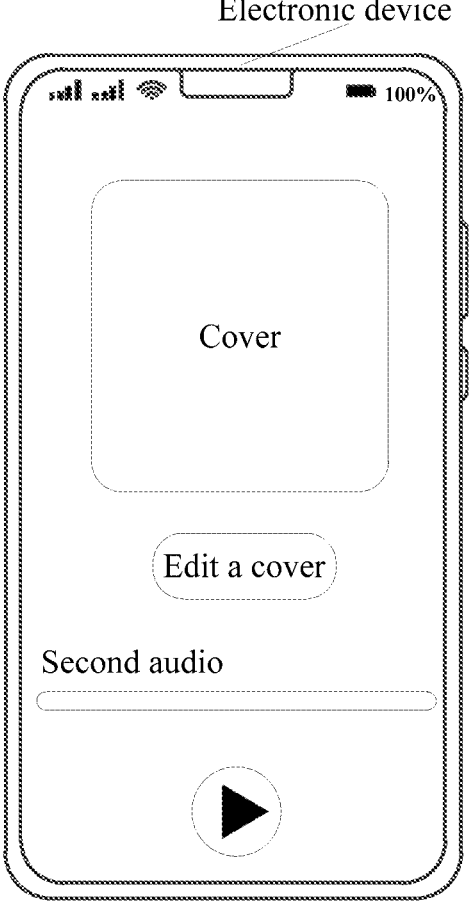
FIG. 11 is a schematic diagram of a second interface according to an embodiment of the present disclosure.

FIG. 11 is a schematic diagram of a second interface according to an embodiment of the present disclosure. With reference to FIG. 11, an electronic device is contained. A display interface of the electronic device is the second interface. Included on the second interface are a cover, a cover editing control and a playing control. When the user clicks on the cover editing control, editing to the cover of the second audio can be performed. When the user clicks on the playing control, the second audio can be played on the second interface.

S1002, displaying a cover editing window in response to a triggering operation to the cover editing control.

In an implementation, the cover editing window includes a cover importing control, at least one static cover control, and at least one animation effect control. In an implementation, the cover importing control is used to select a user-defined cover of the second audio. For example, when the user clicks on the cover importing control, the electronic device can display an album, and the user can select an image in the album to be the cover of the second audio. Or, when the user clicks on the cover importing control, the electronic device can jump to the camera, and the user can use the camera to capture an image to be the cover of the second audio.

In an implementation, the static cover control is a pre-set static image. For example, the cover editing window includes therein a static cover control A and a static cover control B, where the static cover control A is an image of the sea and the static cover control B is an image of the sky. If the user clicks on the static cover control A, the cover image of the second audio is the image of the sea. If the user clicks on the static cover control B, the cover image of the second audio is the image of the sky.

In an implementation, the animation effect control is used to indicate an animation effect of the cover of the second audio. For example, the animation effect control may include no effect, a shake effect, zooming in effect, zooming out effect, rotation effect, etc., which is not limited in the embodiments of the present disclosure. For example, when the user clicks on no effect, the cover on the second interface is a stationary cover when playing the second audio, and when the user clicks on the shake effect, the cover on the second interface is a shaking cover when playing the second audio.

In conjunction with FIG. 12, the cover editing window is described as follows.

Figure 12:
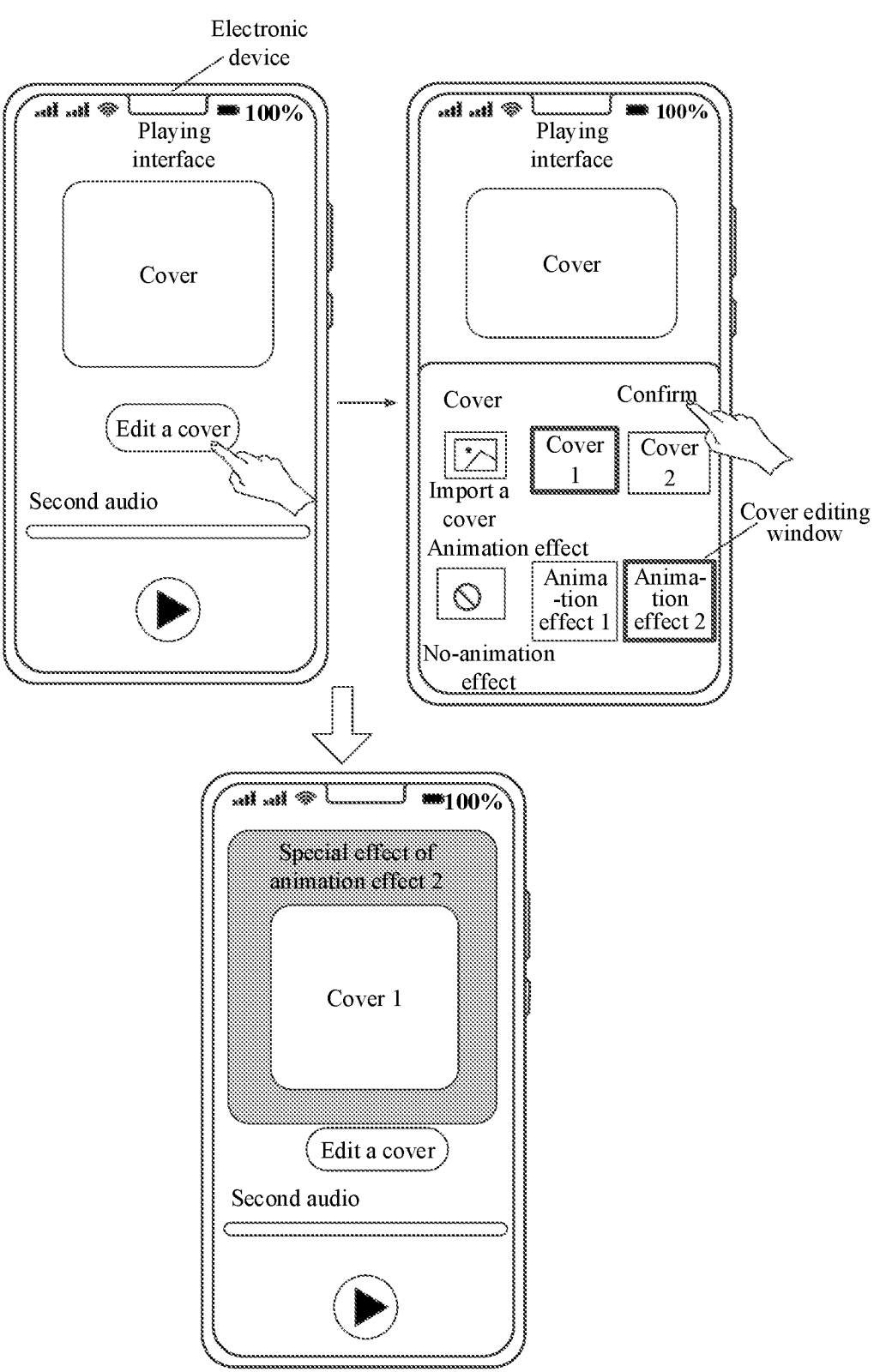
FIG. 12 is a schematic diagram of a cover editing window according to an embodiment of the present disclosure.

FIG. 12 is a schematic diagram of a cover editing window according to an embodiment of the present disclosure. With reference to FIG. 12, an electronic device is contained. A display interface of the electronic device is the playing interface of the second audio. Included on the playing interface are a cover, a cover editing control and a playing control. When the user clicks on the cover editing control, the cover editing window pops up at the bottom of the playing interface.

With reference to FIG. 12, the cover editing window includes therein a cover importing control, a cover 1 control, a cover 2 control, a no-animation effect control, an animation effect 1 control, an animation effect 2 control and a confirmation control. When the user clicks on the cover 1 control and the animation effect 2 control, the cover 1 control and the animation effect 2 control are highlighted. When the user clicks on the confirmation control, the electronic device sets the cover 1 to be the cover in the playing interface, and adds the special effect of the animation effect 2 around the cover 1 which changes with an audio feature of the second audio (this animation effect may be considered as an animation effect layer added at the bottom of the static cover, and the animation effect can dynamically change anywhere around the static cover). In this way, the cover of the second audio can present an animation effect in real-time with the playing progress of the second audio, thereby improving displaying flexibility and effects of the cover.

S1003, displaying on the second interface, in response to a selection operation to a control in the cover editing window, a target cover corresponding to the second audio.

In an implementation, the following practical implementations may be used to display, on the second interface, the target cover corresponding to the second audio: in response to the selection operation to the control in the cover editing window, determining a static cover and an animation effect of the second audio; displaying, according to the audio feature of the second audio, the static cover and the animation effect, a dynamic cover that changes with the audio feature of the second audio. In an implementation, the audio feature includes a meter and/or a volume of the second audio. In an implementation, the audio feature may also be a feature such as an amplitude of the second audio, which is not limited in the embodiments of the present disclosure. For example, if the user selects a static cover control and a shake animation effect in the cover editing window, the cover on the second interface will shake with the meter or the volume of the second audio when the second audio is being played.

In an implementation, the target cover may also be a static cover. For example, if the user selects a static cover control and a no-animation effect in the cover editing window, the cover on the second interface will be a static cover when the second audio is being played.

S1004, playing the second audio in response to a triggering operation to the playing control.

In an implementation, the target cover changes with the audio feature of the second audio being played. For example, when the second audio is being played on the second interface, the cover on the second interface changes with the playing progress of the second audio.

In conjunction with FIG. 13, the process of playing the second audio is described as follows.

Figure 13:
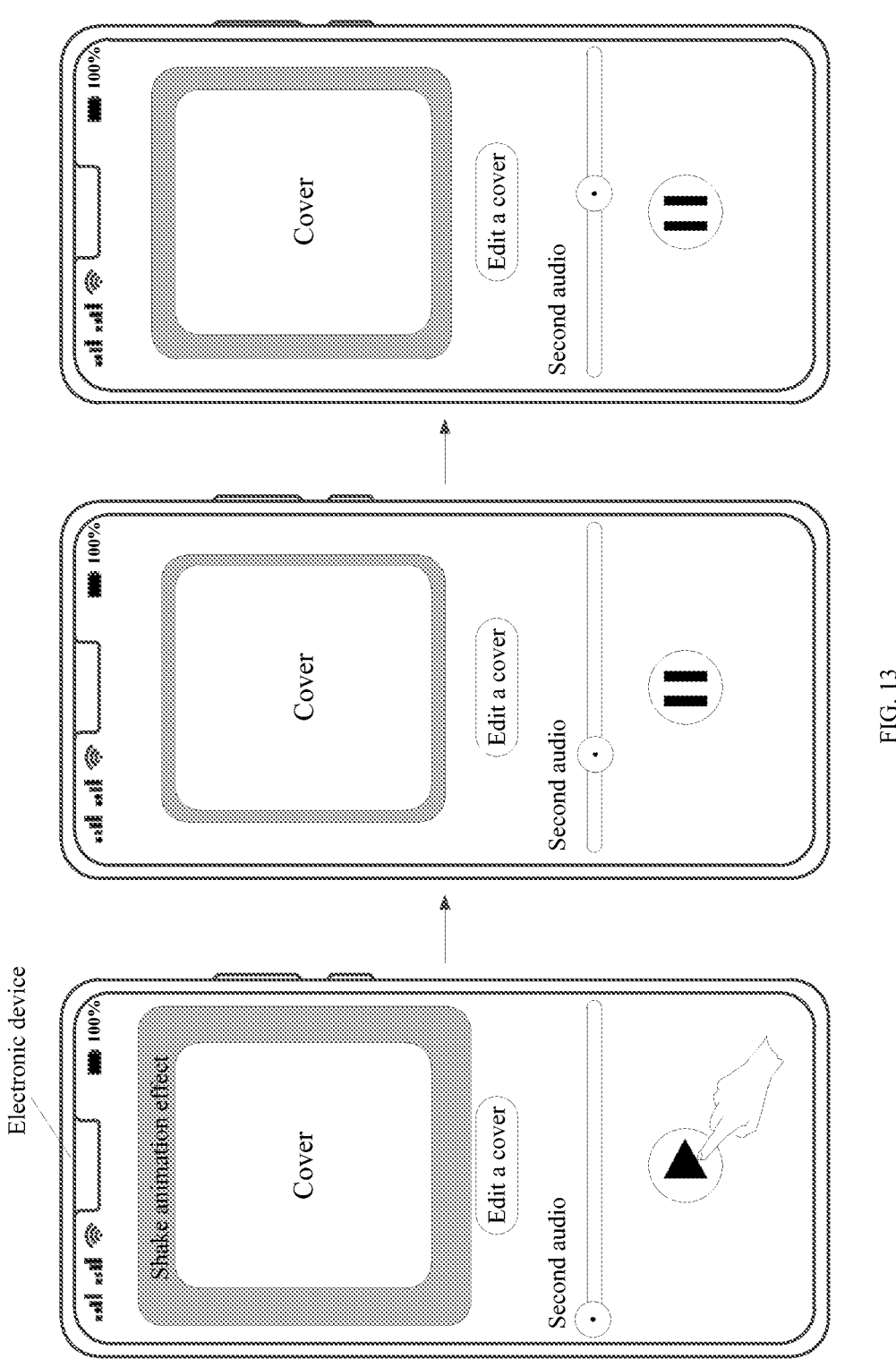
FIG. 13 is a schematic diagram of a process of playing a second audio according to an embodiment of the present disclosure.

FIG. 13 is a schematic diagram of a process of playing a second audio according to an embodiment of the present disclosure. With reference to FIG. 13, an electronic device is contained. A display interface of the electronic device is the playing interface of the second audio. Included on the playing interface are a cover of the second audio and a playing control, and a shake animation effect is around the cover. When the user clicks on the playing control, the electronic device starts playing the second audio. The shake effect of the cover changes in real-time with the audio feature (a frequency, an amplitude, etc.) of the second audio during playing. In this way, the cover may be dynamically displayed when the second audio is being played, thereby improving displaying effect of the cover.

According to a method for displaying a playing interface of a second audio provided in an embodiment of the present disclosure, an electronic device displays a second interface, displays a cover editing window in response to a triggering operation to a cover editing control on the second interface, determines a static cover and an animation effect of the second audio in response to a selection operation to a control in the cover editing window, displays, according to the audio feature of the second audio, the static cover and the animation effect, a dynamic cover that changes with the audio feature of the second audio, and plays the second audio in response to a triggering operation to a playing control on the second interface. In this way, the user can select freely an effect of a cover of the second audio, such that the displaying flexibility of the cover is improved for the second audio. Since the dynamic cover can change with the feature of the audio, the displaying effect of the cover is improved.

An embodiment of the present disclosure further includes a method for displaying a first interface. Based on any one of the foregoing embodiments, in conjunction with FIG. 14, the method for displaying a first interface is described as follows.

Figure 14:
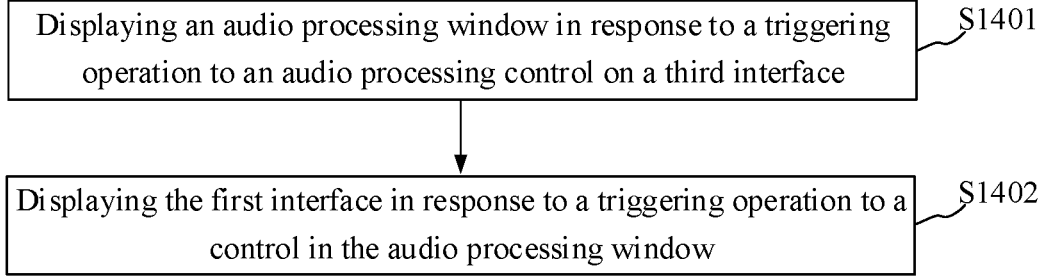
FIG. 14 is a schematic flowchart of a method for displaying a first interface according to an embodiment of the present disclosure.

FIG. 14 is a schematic flowchart of a method for displaying a first interface according to an embodiment of the present disclosure. With reference to FIG. 14, the process of the method includes:

S1401, displaying an audio processing window in response to a triggering operation to an audio processing control on a third interface.

In an implementation, the audio processing window includes therein one or more audio editing controls. For example, the one or more audio editing controls are used for triggering execution of corresponding audio editing on the first audio. In an implementation, the audio editing includes one or more of the following: editing an audio to optimize the audio; extracting vocals and/or accompaniment from an audio; extracting vocals from an audio and mixing the extracted vocals with preset accompaniment; extracting vocals from one audio piece and extracting accompaniment from another audio piece, and mixing the extracted vocals with the extracted accompaniment. For example, by means of the audio editing control(s), the user can extract vocals from an audio piece and extract accompaniment from another audio piece, and further mix the extracted vocals with the extracted accompaniment to form a new audio, thereby improving flexibility of audio editing.

In an implementation, the third interface further includes thereon a control for triggering execution of processing on an audio effect of the first audio. In an implementation, the audio effect includes one or more of the following: reverberation, equalization, electronication, phasing, flanging, filtering, and chorusing. In an implementation, the audio effect may further include other audio effect processing modes, which is not limited in the embodiments of the present disclosure.

S1402, displaying the first interface in response to a triggering operation to a control in the audio processing window.

In an implementation, the first interface is displayed in response to the triggering operation to the control in the audio processing window. For example, if the user clicks on an arrangement control in the audio processing window, the electronic device will jump from the third interface to the first interface.

In conjunction with FIG. 15, the progress of displaying the first interface is described as follows.

Figure 15:
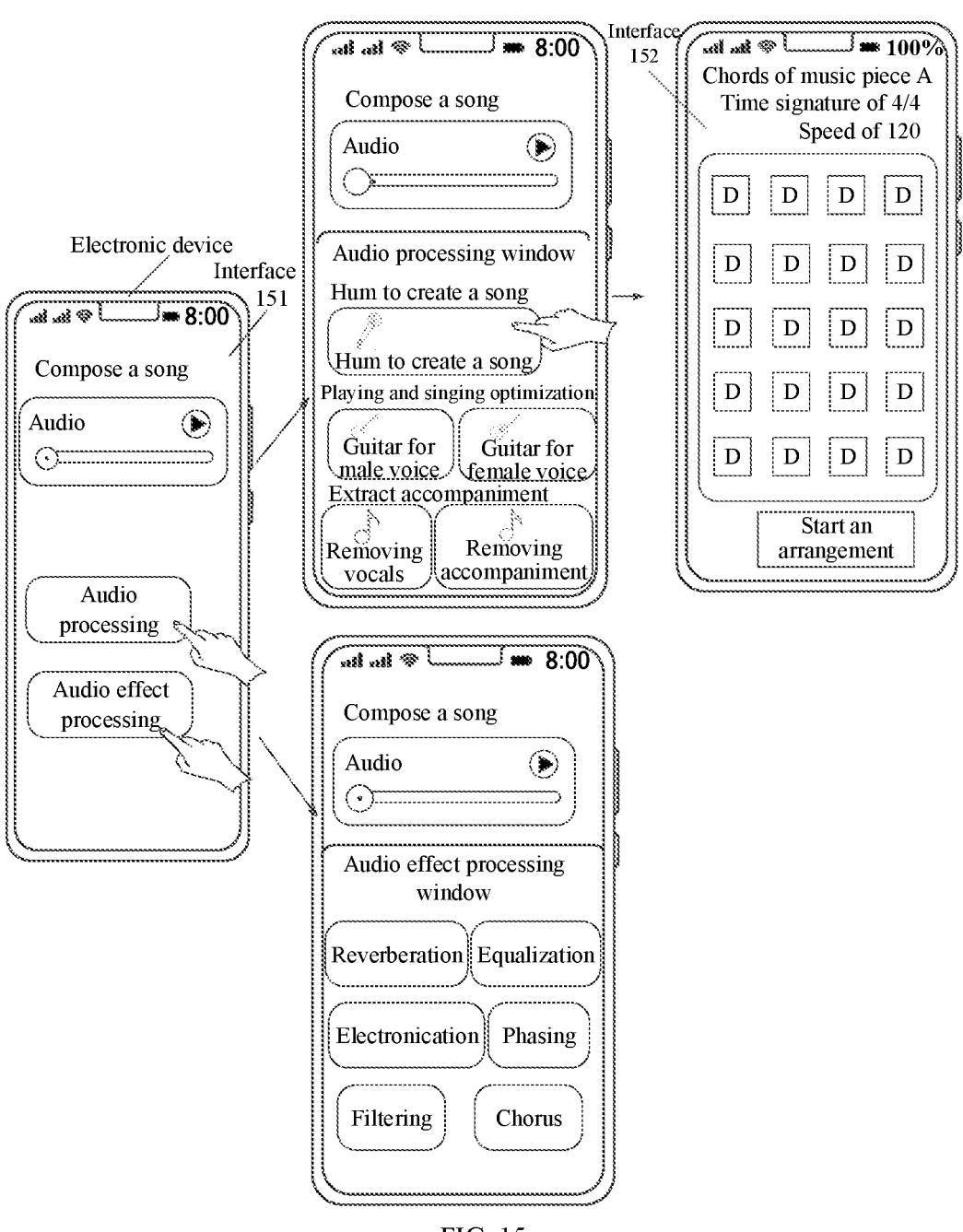
FIG. 15 is a schematic diagram of a process of displaying a first interface according to an embodiment of the present disclosure.

FIG. 15 is a schematic diagram of a process of displaying a first interface according to an embodiment of the present disclosure. With reference to FIG. 15, an electronic device is contained. The electronic device includes a interface 151 and a interface 152. The interface 151 includes thereon an audio to be edited, an audio processing control and an audio effect processing control. When the user clicks on the audio effect processing control, an audio effect processing window pops up on the interface 151. The audio effect processing window includes therein a reverberation control, an equalization control, an electronication control, a phasing control, a filtering control and a chorusing control. When the user clicks on a control in the audio effect processing window, the electronic device can perform related audio effect processing on the audio.

With reference to FIG. 15, when the user clicks on the audio processing control, the electronic device pops up an audio processing window at the bottom of the interface 151. The audio processing window includes a "hum to create a song" control, a "guitar for male voice" control, a "guitar for female voice" control, a "vocal removing" control, and an "accompaniment removing" control.

With reference to FIG. 15, when the user clicks on the "hum to create a song" control, the electronic device jumps from the interface 151 to the interface 152. A plurality of chords of an audio are displayed on the interface 152. In this way, when a music has a poor effect after being arranged by the user, the user can perform an arrangement on the arranged music, thereby improving the effect of the arrangement and the flexibility of the arrangement.

An embodiment of the present disclosure provides a method for displaying a first interface that allows for: displaying an audio processing window in response to a triggering operation to an audio processing control on a third interface, and displaying the first interface in response to a triggering operation to a control in the audio processing window. In this way, on the third interface, not only the editing processing can be performed on the audio, but also the audio effect processing can be performed on the audio, thereby improving the flexibility of audio processing, and satisfying the user's personalized needs for audio production. Moreover, the first interface is displayed through the triggering operation to the third interface by the user, thereby improving displaying efficiency of the first interface, and improving efficiency of audio processing.

Based on any one of the foregoing embodiments, in conjunction with FIGS. 16A, 16B and 16C, a process of the foregoing audio processing method is described as follows.

Figure 16:
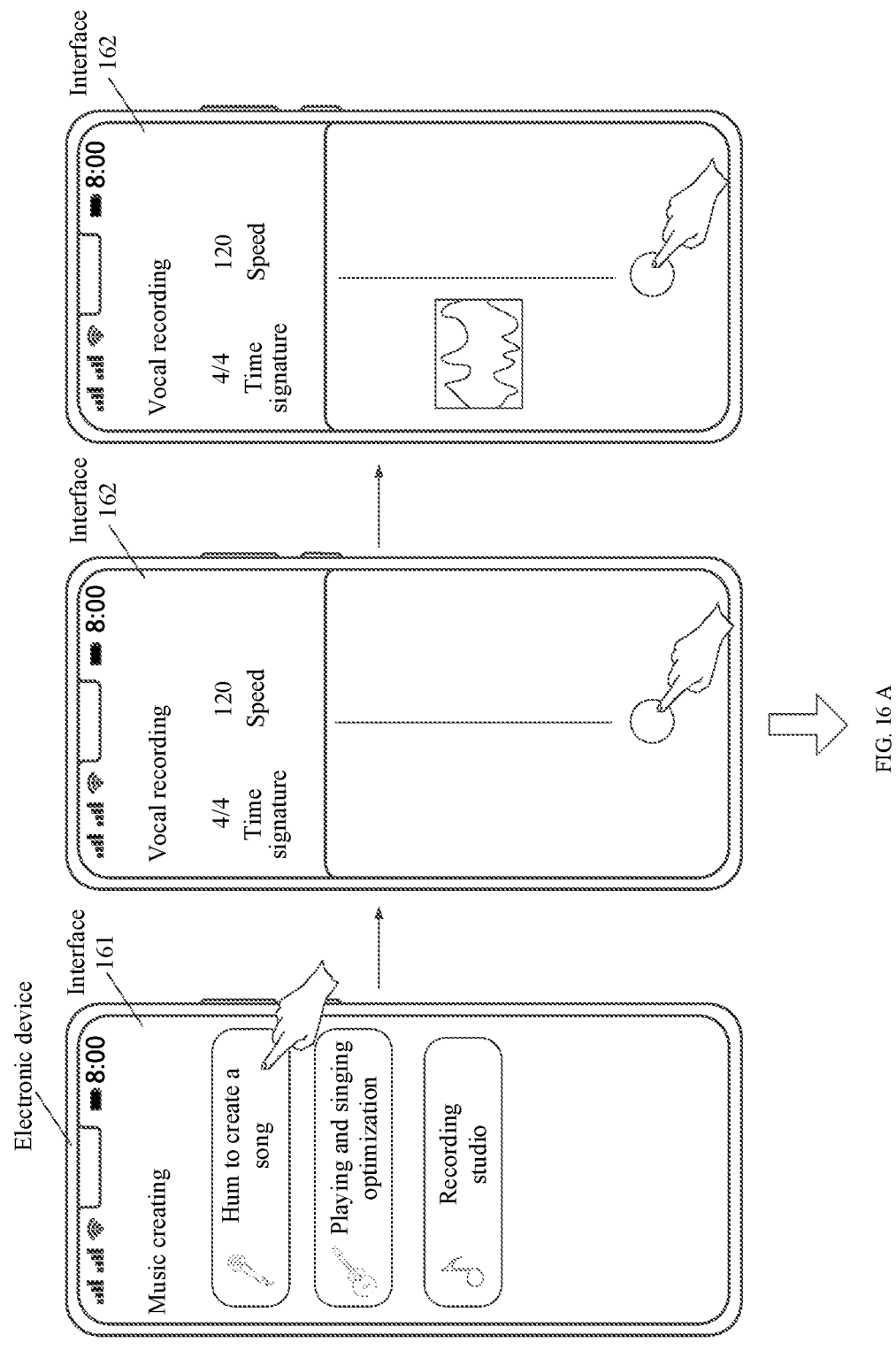
FIGS. 16A, 16B and 16C are schematic diagrams of a process of an audio processing method according to an embodiment of the present disclosure.
Figure 16B:
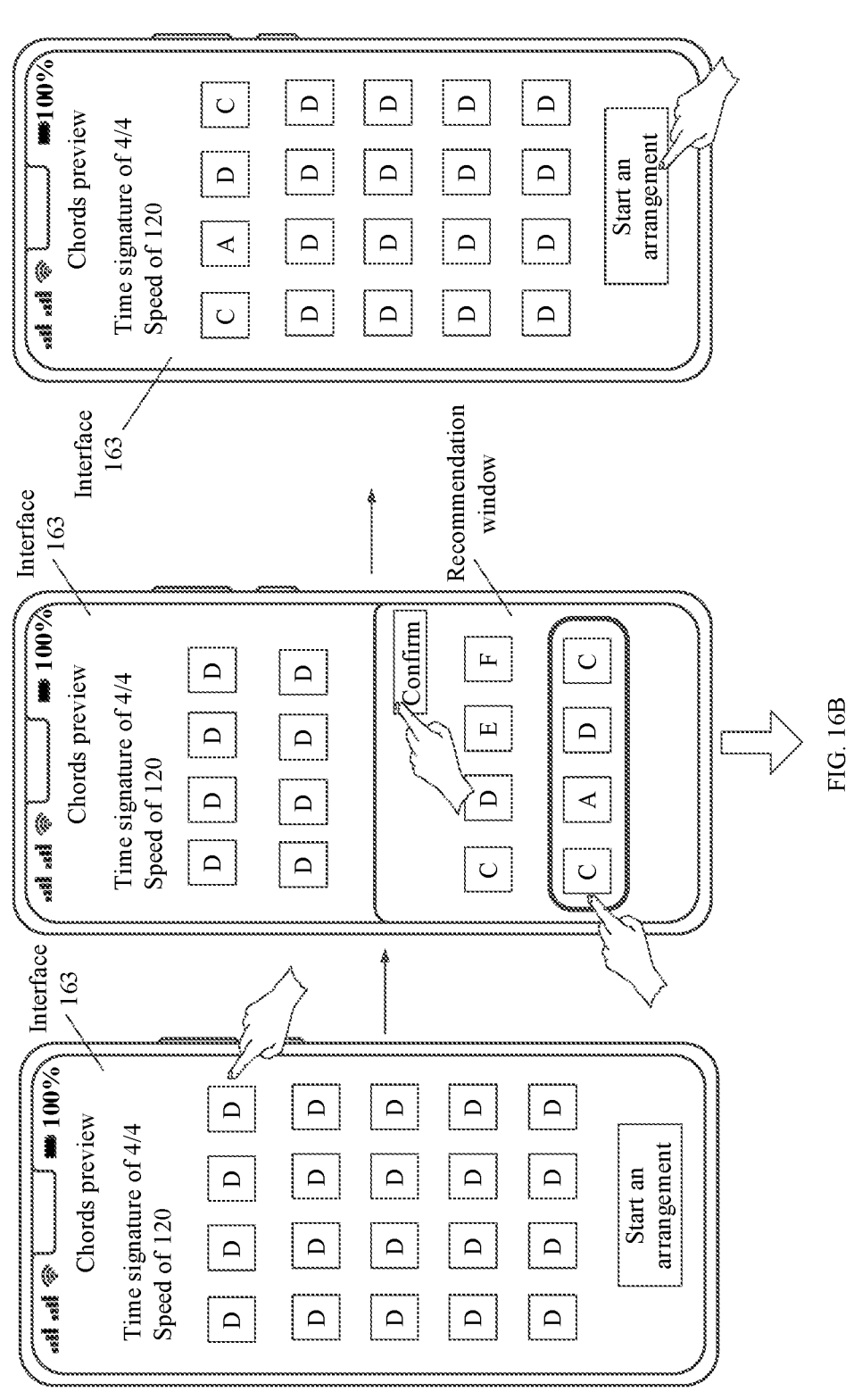
Figure 16C:
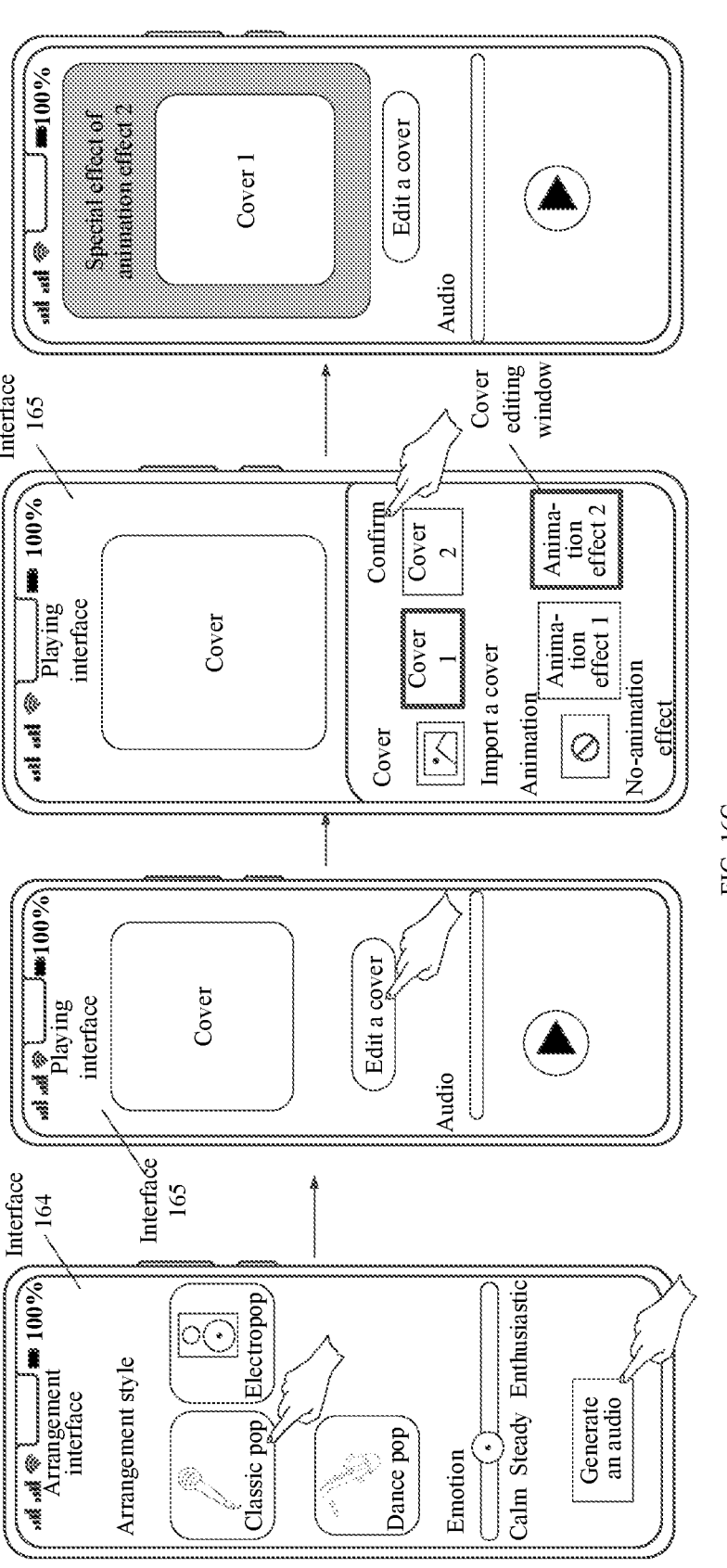

FIGS. 16A, 16B and 16C are schematic diagrams of a process of an audio processing method according to an embodiment of the present disclosure. With reference to FIGS. 16A, 16B and 16C, an electronic device is contained. A interface 161 of the electronic device is a music creating interface, where the interface 161 includes thereon a hum to create a song control, a playing and singing optimization control and a recording studio control. When the user clicks on the hum to create a song control, the electronic device jumps from the interface 161 to the interface 162.

With reference to FIGS. 16A, 16B and 16C, the interface 162 is an audio recording interface, with a time signature of 4/4 and a speed of 120 for vocal recording. When the user clicks on a recording control, the electronic device starts vocal recording, and displays a spectrogram of the recorded vocals in a recording window. When the user clicks on the recording control again, the electronic device stops recording and jumps from the interface 162 to the interface 163.

With reference to FIGS. 16A, 16B and 16C, the interface 163 shows a chord preview interface of the recorded audio. The chord preview interface includes thereon a plurality of chords associated with the recorded vocals (for the convenience of description, all of the chords on the interface 163 are in a D key). When the user clicks on a first set of chords, the electronic device pops up a recommendation window on the interface 163. Included in the recommendation window are 2 sets of candidate chords, where the first set of candidate chords are C, D, E, and F, and the second set of candidate chords are C, A, D, and C.

With reference to FIGS. 16A, 16B and 16C, when the user clicks on the second set of candidate chords, the second set of candidate chords in the recommendation window are highlighted. When the user clicks on the confirmation control in the recommendation window, the electronic device replaces the first set of chords on the interface 163 with the second set of candidate chords C, A, D, and C. When the user clicks on an arrangement starting control, the electronic device jumps from the interface 163 to the interface 164.

With reference to FIGS. 16A, 16B and 16C, included on the interface 164 are an arrangement style control, an emotion control and an audio generating control. The arrangement style control may include a classic pop control, an electropop control, and a dance pop control. The emotion type control may emotions ranging from calm to steady to enthusiastic. When the user clicks on the classic pop control, the electronic device determines that an arrangement style is the classic pop style. When the user swipes the emotion type control to steady, the electronic device determines that an arrangement emotion is steady. When the user clicks on the audio generating control, the electronic device generates an audio that is obtained based on the arrangement style, the arrangement emotion and the plurality of chords, and jumps from the interface 164 to the interface 165.

With reference to FIGS. 16A, 16B and 16C, included on the interface 165 are a cover, a cover editing control and a playing control. When the user clicks on the cover editing control, a cover editing window pops up at the bottom of the interface 165. The cover editing window includes therein a cover importing control, a cover 1 control, a cover 2 control, a no-animation effect control, an animation effect 1 control, an animation effect 2 control and a confirmation control. When the user clicks on the cover 1 control and the animation effect 2 control, the cover 1 control and the animation effect 2 control are highlighted.

With reference to FIGS. 16A, 16B and 16C, when the user clicks on the confirmation control, the electronic device sets the cover 1 to be the cover on the interface 165, and adds the special effect of the animation effect 2 around the cover 1 which changes with an audio feature of the audio. In this way, the cover of the audio can present an animation effect in real-time with the playing progress of the audio, thereby improving displaying flexibility and effects of the cover. By means of the touching operation to the first interface, the user can freely conduct modification to a chord being displayed on the first interface, such that the user can conduct the arrangement to the first audio at will, thereby improving the flexibility of the arrangement.

Figure 17:
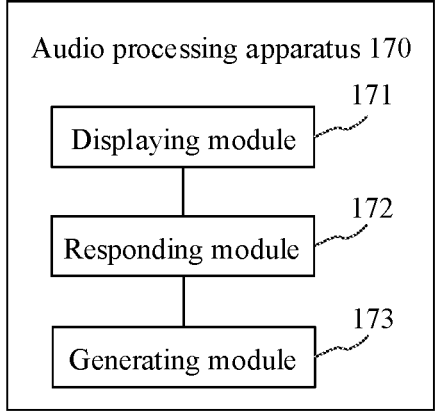
FIG. 17 is a schematic structural diagram of an audio processing apparatus according to an embodiment of the present disclosure.

FIG. 17 is a schematic structural diagram of an audio processing apparatus according to an embodiment of the present disclosure. With reference to FIG. 17, the audio processing apparatus 170 includes a displaying module 171, a responding module 172 and a generating module 173, where the displaying module 171 is configured to display a first interface, the first interface includes a first chord of a first audio;

the responding module 172 is configured to trigger, in response to a triggering operation to the first interface, a modification to the first chord, and obtain a second chord; and the generating module 173 is configured to generate a second audio based on the second chord.

In a possible implementation, the responding module 172 is specifically configured to:

display, in response to a triggering operation to the first interface, at least one set of candidate chords associated with the first chord; and obtain the second chord in response to a selection operation to one set of candidate chords in the at least one set of candidate chords.

In a possible implementation, the responding module 172 is specifically configured to:

display in a recommendation window, in response to a triggering operation to the editing control on the first interface, the at least one set of candidate chords associated with the first chord.

In a possible implementation, the responding module 172 is specifically configured to:

in response to a triggering operation to the one set of candidate chords in the at least one set of candidate chords, highlight the one set of candidate chords in a recommendation window; and in response to a triggering operation to a confirmation control in the recommendation window, cancel displaying the first chord on the first interface, display the one set of candidate chords at a position of the first chord, and obtain the second chord.

In a possible implementation, the responding module 172 is specifically configured to:

determine plural sets of matching chords that match the vocal segment and corresponding matching levels; and determine the at least one set of candidate chords from the plural sets of matching chords according to the matching levels.

In a possible implementation, the responding module 172 is specifically configured to:

perform processing on the vocal segment through a preset model, and obtain the plural sets of matching chords corresponding to the vocal segment and the corresponding matching levels;

where the preset model is obtained by learning based on plural sets of samples, the plural sets of samples include vocal segment samples, matching chords samples associated with the vocal segment samples, and matching levels associated with the respective matching chords samples and the vocal segment samples.

In a possible implementation, the generating module 173 is specifically configured to:

in response to a triggering operation to the arrangement control, display an arrangement interface, where the arrangement interface includes an arrangement style control and an audio generating control, the arrangement style control is used to indicate a plurality of musical instruments required for accompaniment of the second audio;

in response to a triggering operation to the arrangement style control, determine an arrangement style type of the second audio; and in response to a triggering operation to the audio generating control, generate the second audio based on the second chord and the arrangement style type.

In another possible implementation, the displaying module 171 is further configured to:

display a second interface, where the second interface includes a cover editing control and a playing control;

display a cover editing window in response to a triggering operation to the cover editing control, where the cover editing window includes a cover importing control, at least one static cover control, and at least one animation effect control;

display on the second interface, in response to a selection operation to a control in the cover editing window, a target cover corresponding to the second audio; and play the second audio in response to a triggering operation to the playing control, where the target cover changes with an audio feature of the second audio being played.

In a possible implementation, the displaying module 171 is specifically configured to:

in response to the selection operation to the control in the cover editing window, determine a static cover and an animation effect of the second audio;

display, according to the audio feature of the second audio, the static cover, and the animation effect, a dynamic cover that changes with the audio feature of the second audio.

In another possible implementation, the responding module 172 is further configured to:

in response to a triggering operation to an audio processing control on a third interface, display an audio processing window, where the audio processing window includes one or more audio editing controls, the one or more audio editing controls are used for triggering execution of corresponding audio editing on the first audio, the third interface further includes a control for triggering execution of processing on an audio effect of the first audio; the first interface is displayed in response to a triggering operation to a control in the audio processing window.

In a possible implementation, the audio effect includes one or more of the following: reverberation, equalization, electronication, phasing, flanging, filtering, and chorusing; the audio editing includes one or more of the following: editing an audio to optimize the audio; extracting vocals and/or accompaniment from an audio; extracting vocals from an audio and mixing the extracted vocals with preset accompaniment; and extracting vocals from one audio piece and extracting accompaniment from another audio piece, and mixing the extracted vocals with the extracted accompaniment.

The audio processing apparatus provided in the embodiment can be used to execute the technical solutions of the foregoing method embodiments, and the implementation principles and beneficial effects thereof are similar, which will not be repeated again in the embodiment.

Figure 18:
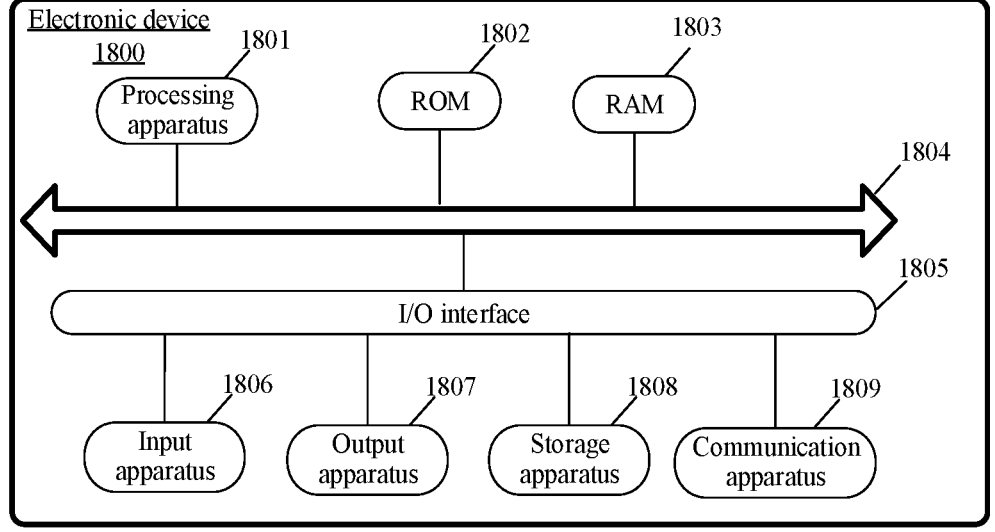
FIG. 18 is a schematic structural diagram of an electronic device according to an embodiment of the present disclosure.

FIG. 18 is a schematic structural diagram of an electronic device according to an embodiment of the present disclosure. Reference may be made to FIG. 18, which shows a schematic structural diagram of an electronic device 1800 suitable for implementing the embodiments of the present disclosure. The electronic device 1800 may be a terminal device or a server. The terminal device may include, but not limited to, mobile terminals such as a mobile phone, a notebook computer, a digital broadcast receiver, a personal digital assistant (Personal Digital Assistant, abbreviated as PDA), a tablet computer (Portable Android Device, abbreviated as PAD), a portable multimedia player (Portable Multimedia Player, abbreviated as PMP), a vehicle-mounted terminal (such as a vehicle-mounted navigation terminal), etc., and stationary terminals such as a digital TV, a desktop computer, etc. The electronic device as shown in FIG. 18 is only an example, which should not impose any limitation on the function and application scope of the embodiments of the present disclosure.

As shown in FIG. 18, the electronic device 1800 may include a processing apparatus (e.g., a central processing unit, a graphics processor, etc.) 1801 which may perform various appropriate actions and processes according to a program stored in a read only memory (Read-Only Memory, abbreviated as ROM) 1802 or a program loaded from a storage apparatus 1808 into a random access memory (Random Access Memory, abbreviated as RAM) 1803. Various programs and data necessary for the operation of the electronic device 1800 are further stored in the RAM 1803. The processing apparatus 1801, ROM 1802, and RAM 1803 are connected to each other through a bus 1804. And an input/output (Input/Output, I/O) interface 1805 is also connected to the bus 1804.

Generally, the following apparatuses may be connected to the I/O interface 1805: an input apparatus 1806 including, for example, a touch screen, a touchpad, a keyboard, a mouse, a camera, a microphone, an accelerometer, a gyroscope, etc.; an output apparatus 1807 including, for example, a liquid crystal display (Liquid Crystal Display, abbreviated as LCD), a speaker, a vibrator, etc.; a storage apparatus 1808 including, for example, a magnetic tape, a hard disk or the like; and a communication apparatus 1809. The communication apparatus 1809 may allow the electronic device 1800 to perform wireless or wired communication with other devices to exchange data. Although FIG. 18 shows the electronic device 1800 having various apparatuses, it should be understood that not all of the illustrated apparatuses are required to be implemented or provided. More or fewer apparatuses may alternatively be implemented or provided.

Particularly, according to an embodiment of the present disclosure, the processes described above with reference to the flowcharts may be implemented as a computer software program. For example, an embodiment of the present disclosure includes a computer program product including a computer program carried on a computer-readable medium, where the computer program includes program codes for performing the method illustrated in the flowchart. In such embodiments, the computer program may be downloaded from a network and installed via the communication apparatus 1809, or installed from the storage apparatus 1808, or installed from the ROM 1802. When the computer program is executed by the processing apparatus 1801, the foregoing functions limited in the method according to the embodiments of the present disclosure are executed.

It should be noted that the computer-readable medium described in the present disclosure may be a computer-readable signal medium or a computer-readable storage medium or any combination thereof. The computer-readable storage medium for example may be, but not limited to, an electrical, a magnetic, an optical, an electromagnetic, an infrared, or a semiconductor system, apparatus or device, or any combination thereof. More specific examples of the computer-readable storage medium may include, but not limited to, an electrically connected portable computer disk with one or more wires, a hard disk, a random access memory (RAM), a read only memory (ROM), an erasable programmable read only memory (Erasable Programmable Read-Only Memory, EPROM or a flash memory), an optical fiber, a portable compact disc read only memory (Compact Disc Read Only Memory, CD-ROM), an optical storage device, a magnetic storage device, or any suitable combination thereof. In the present disclosure, the computer-readable storage medium may be any tangible medium that includes or stores a program that may be used by or used in combination with an instruction execution system, apparatus, or device. And in the present disclosure, the computer-readable signal medium may include a data signal propagated in a baseband or as part of a carrier wave, carrying computer-readable program codes therein. Such propagated data signal may take a variety of forms, including but not limited to an electromagnetic signal, an optical signal, or any suitable combination thereof. The computer-readable signal medium may also be any computer-readable medium other than the computer-readable storage medium, and the computer-readable signal medium can transmit, propagate, or transport the program used by or used in combination with the instruction execution system, apparatus or device. The program codes included on the computer-readable medium may be transmitted through any suitable medium including, but not limited to, an electrical wire, an optical fiber cable, an RF (Radio Frequency, Radio Frequency), etc., or any suitable combination thereof.

The foregoing computer-readable medium may be included in the foregoing electronic device; or may exist alone without being assembled into the electronic device.

The foregoing computer-readable medium carries one or more programs, and when the foregoing one or more programs are executed by the electronic device, the electronic device is enabled to implement the methods according to the foregoing embodiments.

The computer program codes for performing an operation of the present disclosure may be written in one or more programming languages or a combination thereof, where the above programming languages include an object-oriented programming language, such as Java, Smalltalk, and C++, as well as a conventional procedural programming language, such as "C" or similar programming languages. The program codes may be executed entirely on a user computer, executed partly on a user computer, executed as a stand-alone software package, executed partly on a user computer and partly on a remote computer, or executed entirely on a remote computer or a server. In a case involving the remote computer, the remote computer may be connected to the user computer through any kind of network, including a local area network (Local Area Network, abbreviated as LAN) or a wide area network (Wide Area Network, abbreviated as WAN), or may be connected to an external computer (e.g., connected via the Internet using an Internet service provider).

The flowchart and block diagrams in the figures illustrate the architecture, functionality, and operation of possible implementations of the system, method and computer program product according to various embodiments of the present disclosure. In this regard, each block in the flowcharts or block diagrams may represent a module, a program segment, or a portion of codes that includes one or more executable instructions for implementing a specified logical function. Furthermore, it should be noted that, in some alternative implementations, functions indicated in the blocks may occur in an order different from that indicated in the figures. For example, two blocks shown in succession may, in fact, be executed substantially concurrently, or the blocks may sometimes be executed in the reverse order, depending upon the functionality involved. It also should be noted that each block of the block diagrams and/or flow-charts, or a combination of blocks in the block diagrams and/or flowcharts may be implemented in a special purpose hardware-based system that perform a specified function or operation, or may be implemented in a combination of special purpose hardware and a computer instruction.

The involved units described in embodiments of the present disclosure may be implemented by means of software, and may also be implemented by means of hardware. Names of these units do not constitute a limitation on the units per se under certain circumstances. For example, a first acquiring unit can also be described as "a unit for acquiring at least two internet protocol addresses".

The foregoing functions described herein may be performed, at least in part, by one or more hardware logic components. For example, without limitation, exemplary types of hardware logic components that may be used include: a field programmable gate array (Field Programmable Gate Array, FPGA), an application specific integrated circuit (Application Specific Integrated Circuit, ASIC), an application specific standard product (Application Specific Standard Product, ASSP), a system on a chip (System On a Chip, SOC), a complex programmable logic device (Complex Programmable Logic Device, CPLD) and more.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. The machine-readable medium may include, but not limited to, an electronic, a magnetic, an optical, an electromagnetic, an infrared, or a semiconductor system, apparatus, or device, or any suitable combination of the foregoing. More specific examples of the machine-readable storage medium would include electrically connected portable computer disks based on one or more wires, hard disks, a random access memory (RAM), a read only memory (ROM), an erasable programmable read only memory (EPROM or a flash memory), fiber optics, portable compact disc read only memory (CD-ROM), optical storage devices, magnetic storage devices, or any suitable combination of the foregoing.

It should be noted that the modifiers of "a" and "a plurality of" mentioned in the present disclosure are illustrative rather than restrictive, and those skilled in the art should understand that they should be interpreted as "one or more" unless indicated otherwise explicitly in the context.

The names of messages or information exchanged between a plurality of devices in the embodiments of the present disclosure are only for illustrative purposes, and are not intended to limit the scope of the messages or information.

It should be understood that, before applying the technical solutions disclosed in the embodiments of the present disclosure, according to related laws and regulations, an appropriate manner should be used to inform a user of personal information related to the present disclosure in respect of its type, scope of usage, scenario of usage etc., and authorization from the user should be obtained.

For example, in response to receiving an active request from a user, send prompt information to the user to explicitly prompt the user that an operation the user requests to perform will require acquisition and use of personal information of the user. Thus, the user can autonomously choose, according to the prompt information, whether or not to provide personal information to software or hardware that executes the operations of the technical solutions of the present disclosure, such as an electronic device, an application program, a server, a storage medium etc.

As an optional but non-limiting implementation, in response to receiving an active request from a user, send prompt information to the user, for example, in a form of a pop-up window, where the pop-up window may present the prompt information in text. In addition, the popup window may further carry a selection control indicating selection for the user to "agree" or "disagree" to provide personal information to the electronic device.

It can be understood that, the foregoing process of informing and obtaining authorization from the user is merely illustrative, and do not constitute limitation to the implementations of the present disclosure, and other manners conforming with relevant laws and legal regulations may also be applied to the implementations of the present disclosure.

It is to be understood that the data involved in the present technical solutions (including but not limited to the data itself, and the acquisition or usage of the data) should comply with the requirements of corresponding laws and legal regulations, and other related regulations. The data may include information, parameters, and messages, for example, traffic offload indication information.

The above descriptions are merely preferred embodiments of the present disclosure and illustrations of an applied technical principle. The person skilled in the art should understand that the disclosure scope involved in the present disclosure is not limited to a technical solution formed by a specific combination of the above-mentioned technical features, and should also cover other technical solutions formed by any combination of the above technical features or their equivalents without departing from the above disclosure concept, for example, a technical solution formed by a mutual replacement between the above features and the technical features with similar functions (but not limited to) disclosed in the present disclosure.

In addition, although operations are depicted in a particular order, it should not be construed as requiring these operations to be performed in the specific order shown or in a sequential order. Under a certain circumstance, multitasking and parallel processing may be advantageous. Likewise, although the above discussion contains several implementation-specific details, these should not be interpreted as limiting the scope of the present disclosure. Certain features described in the context of individual embodiments may also be implemented in combination in a single embodiment. Conversely, various features described in the context of a single embodiment may also be implemented in a plurality of embodiments individually or in any suitable sub-combination.

Although the subject matter has been described in language specific to a structural feature and/or a methodological action, it should be understood that the subject matter defined in the appended claims is not necessarily limited to the specific features or actions described above. On the contrary, the specific features and actions described above are merely an example form for implementing the claims.

The invention claimed is:

1. An audio processing method, comprising:
    displaying a first interface, wherein the first interface comprises a first chord of a first audio;
    triggering, in response to an operation to the first interface, a modification to the first chord, and obtaining a second chord; and
    generating a second audio based on the second chord,
    wherein the first interface comprises an arrangement control, and
    wherein generating the second audio based on the second chord comprises:
        in response to a triggering operation to the arrangement control, displaying an arrangement interface, wherein the arrangement interface comprises an arrangement style control and an audio generating control, the arrangement style control is used to indicate a plurality of musical instruments required for accompaniment of the second audio;
        in response to a triggering operation to the arrangement style control, determining an arrangement style type of the second audio; and
        in response to a triggering operation to the audio generating control, generating the second audio based on the second chord and the arrangement style type.

2. The method according to claim 1, wherein triggering, in response to the operation to the first interface, the modification to the first chord, and obtaining the second chord comprise:
    displaying, in response to the operation to the first interface, at least one set of candidate chords associated with the first chord; and
    obtaining the second chord in response to a selection operation to one set of candidate chords among the at least one set of candidate chords.

3. The method according to claim 2, wherein the first interface comprises an editing control associated with the first chord, and displaying, in response to the operation to the first interface, the at least one set of candidate chords associated with the first chord comprises:
    displaying in a recommendation window, in response to an operation to the editing control on the first interface, the at least one set of candidate chords associated with the first chord.

4. The method according to claim 2, wherein obtaining the second chord in response to the selection operation to one set of candidate chords in the at least one set of candidate chords comprises:
    in response to an operation to the one set of candidate chords in the at least one set of candidate chords, highlighting the one set of candidate chords in a recommendation window; and
    in response to an operation to a confirmation control in the recommendation window, cancelling displaying the first chord on the first interface, displaying the one set of candidate chords at a position of the first chord, and obtaining the second chord.

5. The method according to claim 2, wherein the first chord is determined based on a vocal segment in the first audio, and the at least one set of candidate chords is determined through the following steps:
    determining plural sets of matching chords that match the vocal segment and corresponding matching levels; and
    determining the at least one set of candidate chords from the plural sets of matching chords according to the matching levels.

6. The method according to claim 5, wherein determining the plural sets of matching chords that match the vocal segment and the corresponding matching levels comprises:
    performing processing on the vocal segment through a preset model, and obtaining the plural sets of matching chords corresponding to the vocal segment and the corresponding matching levels;
    wherein the preset model is obtained by learning based on plural sets of samples, the plural sets of samples comprise vocal segment samples, matching chords samples associated with the vocal segment samples, and matching levels associated with the respective matching chords samples and the vocal segment samples.

7. The method according to claim 1, wherein after generating the second audio based on the second chord, the method further comprises:
    displaying a second interface, wherein the second interface comprises a cover editing control and a playing control;
    displaying a cover editing window in response to an operation to the cover editing control, wherein the cover editing window comprises a cover importing control, at least one static cover control, and at least one animation effect control;

displaying on the second interface, in response to a selection operation to a control in the cover editing window, a target cover corresponding to the second audio; and playing the second audio in response to an operation to the playing control, wherein the target cover changes with an audio feature of the second audio being played.

8. The method according to claim 7, wherein displaying on the second interface, in response to the selection operation to the control in the cover editing window, the target cover corresponding to the second audio comprises:

in response to the selection operation to the control in the cover editing window, determining a static cover and an animation effect of the second audio; and displaying, according to the audio feature of the second audio, the static cover and the animation effect, a dynamic cover that changes with the audio feature of the second audio.

9. The method according to claim 1, wherein before displaying the first interface, the method further comprises:

in response to an operation to an audio processing control on a third interface, displaying an audio processing window, wherein the audio processing window comprises one or more audio editing controls, the one or more audio editing controls are used for triggering execution of corresponding audio editing on the first audio, the third interface further comprises a control for triggering execution of processing on an audio effect of the first audio; the first interface is displayed in response to a triggering operation to a control in the audio processing window.

10. The method according to claim 9, wherein the audio effect comprises one or more of the following: reverberation, equalization, electronication, phasing, flanging, filtering, and chorusing;

the audio editing comprises one or more of the following: editing an audio to optimize the audio; extracting vocals and/or accompaniment from an audio; extracting vocals from an audio and mixing the extracted vocals with preset accompaniment; and extracting vocals from one audio piece and extracting accompaniment from another audio piece, and mixing the extracted vocals with the extracted accompaniment.

11. An electronic device, comprising a processor and a memory;

wherein the memory has, stored thereon, computer executable instructions;

the processor executes the computer executable instructions stored on the memory in such a manner that the processor implements the steps of:

displaying a first interface, wherein the first interface comprises a first chord of a first audio;

triggering, in response to an operation to the first interface, a modification to the first chord, and obtaining a second chord; and generating a second audio based on the second chord, wherein the first interface comprises an arrangement control, and wherein generating the second audio based on the second chord comprises:

in response to a triggering operation to the arrangement control, displaying an arrangement interface, wherein the arrangement interface comprises an arrangement style control and an audio generating control, the arrangement style control is used to indicate a plurality of musical instruments required for accompaniment of the second audio;

in response to a triggering operation to the arrangement style control, determining an arrangement style type of the second audio; and in response to a triggering operation to the audio generating control, generating the second audio based on the second chord and the arrangement style type.

12. The electronic device according to claim 11, wherein the processor executes the computer executable instructions stored on the memory in such a manner that the processor implements the steps of:

displaying, in response to the operation to the first interface, at least one set of candidate chords associated with the first chord; and obtaining the second chord in response to a selection operation to one set of candidate chords in the at least one set of candidate chords.

13. The electronic device according to claim 12, wherein the first interface comprises an editing control associated with the first chord, the processor executes the computer executable instructions stored on the memory in such a manner that the processor implements the steps of:

displaying in a recommendation window, in response to an operation to the editing control on the first interface, the at least one set of candidate chords associated with the first chord.

14. The electronic device according to claim 12, wherein the processor executes the computer executable instructions stored on the memory in such a manner that the processor implements the steps of:

in response to an operation to the one set of candidate chords in the at least one set of candidate chords, highlighting the one set of candidate chords in a recommendation window; and in response to an operation to a confirmation control in the recommendation window, cancelling displaying the first chord on the first interface, displaying the one set of candidate chords at a position of the first chord, and obtaining the second chord.

15. The electronic device according to claim 12, wherein the first chord is determined based on a vocal segment in the first audio, the processor executes the computer executable instructions stored on the memory in such a manner that the processor implements the steps of:

determining plural sets of matching chords that match the vocal segment and corresponding matching levels; and determining the at least one set of candidate chords from the plural sets of matching chords according to the matching levels.

16. The electronic device according to claim 15, wherein the processor executes the computer executable instructions stored on the memory in such a manner that the processor implements the steps of:

performing processing on the vocal segment through a preset model, and obtaining the plural sets of matching chords corresponding to the vocal segment and the corresponding matching levels;

wherein the preset model is obtained by learning based on plural sets of samples, the plural sets of samples comprise vocal segment samples, matching chords samples associated with the vocal segment samples, and matching levels associated with the respective matching chords samples and the vocal segment samples.

17. The electronic device according to claim 11, wherein the processor executes the computer executable instructions stored on the memory in such a manner that the processor further implements the steps of:

displaying a second interface, wherein the second interface comprises a cover editing control and a playing control;

displaying a cover editing window in response to an operation to the cover editing control, wherein the cover editing window comprises a cover importing control, at least one static cover control, and at least one animation effect control;

displaying on the second interface, in response to a selection operation to a control in the cover editing window, a target cover corresponding to the second audio; and playing the second audio in response to an operation to the playing control, wherein the target cover changes with an audio feature of the second audio being played.

18. A non-transitory computer-readable storage medium on which computer executable instructions are stored, wherein the computer executable instructions, when being executed by a processor, implement the steps of:

displaying a first interface, wherein the first interface comprises a first chord of a first audio;

triggering, in response to an operation to the first interface, a modification to the first chord, and obtaining a second chord; and generating a second audio based on the second chord, wherein the first interface comprises an arrangement control, and wherein generating the second audio based on the second chord comprises:

in response to a triggering operation to the arrangement control, displaying an arrangement interface, wherein the arrangement interface comprises an arrangement style control and an audio generating control, the arrangement style control is used to indicate a plurality of musical instruments required for accompaniment of the second audio;

in response to a triggering operation to the arrangement style control, determining an arrangement style type of the second audio; and in response to a triggering operation to the audio generating control, generating the second audio based on the second chord and the arrangement style type.

\* \* \* \* \*